(12) United States Patent
Kimura et al.

(10) Patent No.: US 10,817,105 B2
(45) Date of Patent: Oct. 27, 2020

(54) LIQUID CRYSTAL DISPLAY DEVICE

(71) Applicant: TOPPAN PRINTING CO., LTD., Taito-ku (JP)

(72) Inventors: Yukihiro Kimura, Taito-ku (JP); Kenzo Fukuyoshi, Taito-ku (JP); Yutaka Ito, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 129 days.

(21) Appl. No.: 16/022,353

(22) Filed: Jun. 28, 2018

(65) Prior Publication Data

US 2018/0321788 A1 Nov. 8, 2018

Related U.S. Application Data

(63) Continuation of application No. PCT/JP2015/086554, filed on Dec. 28, 2015.

(51) Int. Cl.
*G06F 3/041* (2006.01)
*G02F 1/1362* (2006.01)
(Continued)

(52) U.S. Cl.
CPC .......... *G06F 3/0416* (2013.01); *G02F 1/1368* (2013.01); *G02F 1/13306* (2013.01);
(Continued)

(58) Field of Classification Search
CPC .......... G02F 1/13306; G02F 1/133345; G02F 1/13338; G02F 1/133512; G02F 1/133514;
(Continued)

(56) References Cited

U.S. PATENT DOCUMENTS 7,298,354 B2 * 11/2007 Yang .................... G09G 3/3659
345/90
7,580,026 B2 * 8/2009 Liu ........................ G02F 1/167
345/107
(Continued)

FOREIGN PATENT DOCUMENTS

JP 4-22486 B2 4/1992
JP 7-36017 A 2/1995
(Continued)

OTHER PUBLICATIONS

International Search Report dated Mar. 15, 2016 in PCT/JP2015/086554, filed Dec. 28, 2015, 5 pages.
(Continued)

*Primary Examiner* — Kenneth Bukowski
(74) *Attorney, Agent, or Firm* — Oblon, McClelland, Maier & Neustadt, L.L.P.

(57) ABSTRACT

A liquid crystal display device is provided with a display substrate, an array substrate, a liquid crystal layer sandwiched between the display substrate and the array substrate, and control circuitry. The display substrate includes a touch sensing line. The array substrate includes a common electrode having a constant potential, a first insulating layer provided under the common electrode, a pixel electrode provided under the first insulating layer, a second insulating layer provided under the pixel electrode, a conductive line electrically connected to the common electrode under the second insulating layer, a third insulating layer provided under the conductive line, and a first active element and a second active element provided under the third insulating layer and electrically connected to the pixel electrode.

18 Claims, 28 Drawing Sheets

(51) Int. Cl.
G02F 1/1343 (2006.01)
G02F 1/1368 (2006.01)
G02F 1/133 (2006.01)
G02F 1/1333 (2006.01)
G02F 1/1335 (2006.01)
G06F 3/044 (2006.01)
G09G 3/36 (2006.01)

(52) U.S. Cl.
CPC ...... *G02F 1/13338* (2013.01); *G02F 1/13439* (2013.01); *G02F 1/13624* (2013.01); *G02F 1/133345* (2013.01); *G02F 1/133512* (2013.01); *G02F 1/133514* (2013.01); *G02F 1/134309* (2013.01); *G02F 1/134363* (2013.01); *G02F 1/136213* (2013.01); *G06F 3/044* (2013.01); *G06F 3/0412* (2013.01); *G09G 3/3614* (2013.01); *G02F 2001/13685* (2013.01); *G02F 2001/134372* (2013.01); *G02F 2201/121* (2013.01); *G02F 2201/123* (2013.01); *G02F 2202/10* (2013.01); *G06F 2203/04103* (2013.01); *G09G 2300/0426* (2013.01); *G09G 2300/0434* (2013.01); *G09G 2300/0452* (2013.01)

(58) Field of Classification Search
CPC ......... G02F 1/134309; G02F 1/134363; G02F 1/13439; G02F 1/136213; G02F 1/13624; G02F 1/1368; G02F 2001/134372; G02F 2001/13685; G02F 2201/121; G02F 2201/123; G02F 2202/10; G06F 2203/04103; G06F 3/0412; G06F 3/0416; G06F 3/044; G09G 2300/0426; G09G 2300/0434; G09G 2300/0452; G09G 3/3614
See application file for complete search history.

(56) References Cited

U.S. PATENT DOCUMENTS

| | | | |
|---|---|---|---|
| 7,859,521 B2 | 12/2010 | Hotelling et al. | |
| 8,243,027 B2 | 8/2012 | Hotelling et al. | |
| 9,304,639 B2 | 4/2016 | Ishizaki et al. | |
| 9,532,516 B2 | 1/2017 | Church et al. | |
| 2007/0097052 A1* | 5/2007 | Sasaki | G09G 3/3648 345/92 |
| 2008/0024712 A1* | 1/2008 | Kim | G02F 1/13338 349/144 |
| 2012/0105347 A1* | 5/2012 | Pak | G06F 3/0412 345/173 |
| 2012/0287349 A1* | 11/2012 | Tsubata | G09G 3/3637 348/731 |
| 2013/0147730 A1* | 6/2013 | Chien | G06F 3/0412 345/173 |
| 2013/0148068 A1 | 6/2013 | Maeda | |
| 2015/0035791 A1* | 2/2015 | Mo | G09G 3/3648 345/174 |
| 2015/0268776 A1 | 9/2015 | Ishizaki et al. | |
| 2016/0035302 A1* | 2/2016 | Sun | G09G 3/3648 345/209 |
| 2016/0103531 A1* | 4/2016 | Kimura | G02F 1/13338 345/174 |
| 2016/0266697 A1* | 9/2016 | Cheng | G06F 3/0416 |
| 2016/0282990 A1* | 9/2016 | Kimura | G02F 1/13338 |
| 2016/0364082 A1 | 12/2016 | Kimura et al. | |
| 2018/0149930 A1* | 5/2018 | Chen | G02F 1/134336 |

FOREIGN PATENT DOCUMENTS

| | | |
|---|---|---|
| JP | 2007-121767 A | 5/2007 |
| JP | 4584342 B2 | 11/2010 |
| JP | 2013-120257 A | 6/2013 |
| JP | 2014-109904 A | 6/2014 |
| JP | 5517611 B2 | 6/2014 |
| JP | 2014-182203 A | 9/2014 |
| JP | 5746736 B2 | 7/2015 |
| JP | 2015-176573 A | 10/2015 |
| TW | 201533503 A | 9/2015 |
| WO | WO 2014/203418 A1 | 12/2014 |

OTHER PUBLICATIONS

Office Action dated Nov. 15, 2016 in Taiwan application No. 105101467, filed Jan. 19, 2016, 13 pages (with English translation).

* cited by examiner

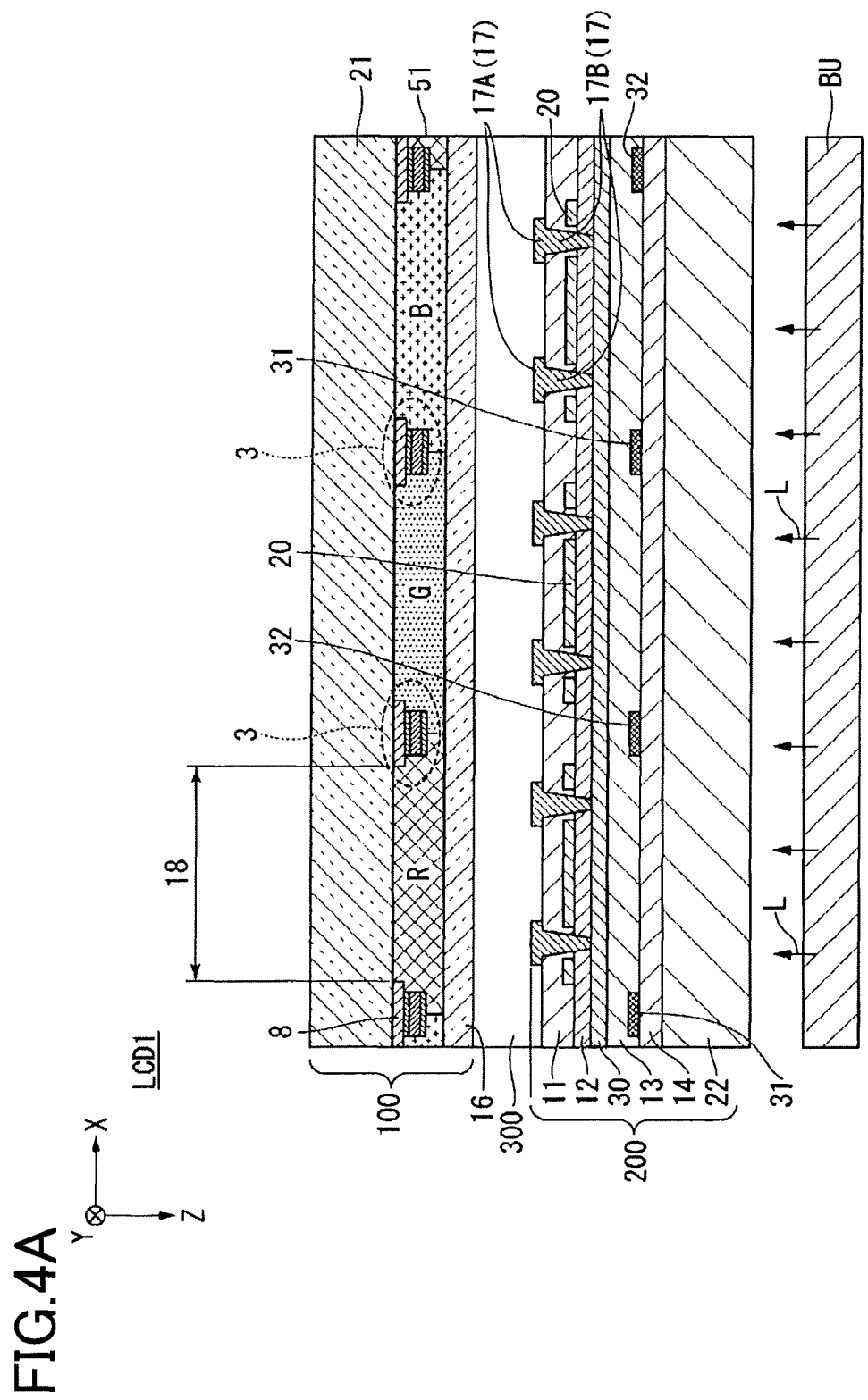

LCD2

LIQUID CRYSTAL DISPLAY DEVICE

CROSS-REFERENCE TO RELATED APPLICATIONS

The present application is a continuation of International Application No. PCT/JP2015/086554, filed Dec. 28, 2015. The entire contents of the above application are incorporated herein by reference.

BACKGROUND OF THE INVENTION

Field of the Invention

The present invention relates to a liquid crystal display device that is capable of stable touch sensing and boasts high touch sensitivity.

Discussion of the Background

Liquid crystal display devices are used for large displays such as of TV sets, tablets, smartphones, and the like. Roughly speaking, liquid crystal display devices have a configuration in which a liquid crystal layer is sandwiched between two transparent substrates such as glass plates. Major liquid crystal driving methods in such liquid crystal display devices are roughly classified into a vertical alignment (VA) mode, which is known as a longitudinal electric field mode, an in-plane switching (IPS) mode, which is known as a transverse electric field mode, and a fringe field switching (FFS) mode.

In the IPS or FFS mode, the liquid crystal is driven by horizontally aligning the liquid crystal molecules relative to the substrate surface of the liquid crystal display device, and by applying an electric field to the liquid crystal molecules in a direction substantially parallel to the substrate. The IPS or FFS mode corresponds to a liquid crystal driving method that is used in liquid crystal display devices having a wide viewing angle. An FFS mode liquid crystal display device has a great advantage of being capable of driving liquid crystal at high speed by use of fringe electric fields.

In these liquid crystal driving methods, polarity inversion driving (AC inversion driving) is carried out to prevent liquid crystal display images from sticking. The polarity inversion driving inverts positive and negative voltages to be applied to a liquid crystal layer after lapse of a predetermined image display period. Known polarity inversion driving methods include a dot inversion driving method which separately inverts the polarities of each of a plurality of pixels, a horizontal line inversion driving method which inverts the polarities of pixels arrayed along the lateral direction of a screen on a row-by-row basis, a column inversion driving method which inverts the polarities of pixels in the vertical direction on a column-by-column basis, and a frame inversion driving method which inverts the polarities of pixels on a screen-by-screen basis, or defines a screen into a plurality of blocks and inverts the polarities of pixels on a block-by-block basis. Such liquid crystal driving techniques are described or suggested in, for example, Patent Literatures (PTLs) 1 to 5 and 7.

Touch sensitive liquid crystal display devices having a means for detecting capacitance are increasingly used as such a liquid crystal display device. Major touch sensing systems that are available use a method, for example, of detecting a change in capacitance that occurs when a pointer such as a finger or a pen touches or comes close to a display screen, by using touch sensing lines (touch electrodes) arrayed in the X and Y directions.

Known touch sensitive display device structures include an out-cell structure, that is, a structure in which a touch sensitive touch panel is attached to a surface of a display device, and an in-cell structure, that is, a structure in which the display device in itself is touch sensitive. Many display devices use the in-cell structure rather than the out-cell structure in recent years.

Patent Literatures 2 to 6 disclose a touch sensing technique using the in-cell structure. The in-cell structure, however, now poses a problem with the touch sensing technique, i.e., a problem that is not disclosed in these patent literatures. Specifically, the problem is that noise occurs from the source lines which establish electrical linkage with the active elements provided inside the liquid crystal cells. This is a new technical challenge that has hardly been posed when a touch panel is externally attached.

Patent Literature 1 discloses a technique for inverting, on a column-by-column basis, the polarities of a plurality of pixels arrayed along the vertical direction of a screen. Patent Literature 1 is silent about the touch sensing technique.

Patent Literature 2 contains description of dot inversion driving and discloses a touch sensing technique. In the disclosure of Patent Literature 2, the drive electrodes and the detection electrodes for exerting touch sensing function are substantially constituted by metal wiring. Such disclosure of Patent Literature 2 is similar to the features of claim 2 set forth in Patent Literature 5.

Patent Literature 3 discloses a technique related to a liquid crystal display of in-plane switching (IPS) that is a technique in which touch sensing drive electrodes form electrode pairs to be used for a display and for detecting touch sensing signals.

Patent Literature 4 discloses a structure in which a touch screen technique is incorporated into a liquid crystal display device driven by longitudinal electric field, in which the counter electrodes are laminated on the color filters. For example, such a structure is recited in claim 1 and described in an example of Patent Literature 4. As recited in claim 1 of Patent Literature 4, each display pixel includes a storage capacitor. The touch driving electrode operates as a counter electrode of the storage capacitor during the display operation. Note that paragraph 0156 and the subsequent paragraphs of Patent Literature 4 disclose a configuration in which two types of in-plane switching (IPS) electrodes are parallel to each other in a single plane. Paragraph 0157 of Patent Literature 4 describes that an IPS display lacks a $V_{com}$ layer usable for touch driving or touch sensing.

In the configuration disclosed in Patent Literature 4, $yV_{com}$ needs to cross over $xV_{com}$ (paragraph 0033, and FIGS. 5, 1E, 1F, etc. of Patent Literature 4).

Patent Literature 4 also discloses a means for controlling degradation in image quality when liquid crystal driving is line-sequentially scanned. According to Patent Literature 4, a polysilicon semiconductor is used for the active elements (TFT: thin film transistors) driving the liquid crystals. Further, a transfer circuit including a latch part is provided for retention of a potential to thereby prevent potential drop of the scanning signal lines inherent to polysilicon TFTs, and also to prevent deterioration in the quality of the liquid crystal display images.

Patent Literature 5 discloses a touch sensing technique using band-like conductors orthogonal to each other between liquid crystal cells.

Patent Literature 6 discloses that a liquid crystal display device includes a plurality of touch driving electrodes (connected to interconnecting conductive lines $xV_{com}$ as a drive area) that are made of a transparent material and extend in a first direction, and a plurality of touch detecting electrodes (connected through $yV_{com}$ as a sensing area) that extend in a second direction, wherein either the touch driving electrodes or the touch detection electrodes act as counter electrodes of the liquid crystal display.

Patent Literature 6 discloses a technique of touch sensing between drive lines including a first group of a plurality of display pixels and sense lines including a second group of a plurality of display pixels, wherein bypass tunnels are provided between circuit elements of the second group.

In the techniques disclosed in Patent Literatures 1 to 7, a means for reducing noise caused by source lines, to which video signals for displaying image are applied, is not fully considered, and therefore are unlikely to provide a highly sensitive touch sensing technique. Also, these techniques are insufficient to reduce or prevent the occurrence of noise associated with liquid crystal driving.

PTL 1 JP H04-22486 B
PTL 2 JP 2014-109904 A
PTL 3 JP 4584342 B
PTL 4 JP 5517611 B
PTL 5 JP H07-36017 A
PTL 6 JP 5746736 B
PTL 7 JP 2014-182203 A

SUMMARY OF THE INVENTION

According to an aspect of the present invention, a liquid crystal display device includes a display substrate, an array substrate, a liquid crystal layer sandwiched between the display substrate and the array substrate, and control circuitry. The display substrate includes a touch sensing line. The array substrate includes a common electrode having a constant potential, a first insulating layer provided under the common electrode, a pixel electrode provided under the first insulating layer, a second insulating layer provided under the pixel electrode, a conductive line electrically connected to the common electrode under the second insulating layer, a third insulating layer provided under the conductive line, and a first active element and a second active element provided under the third insulating layer and electrically connected to the pixel electrode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4A is a partial cross-sectional view taken along the line B-B' of FIG. 2, illustrating the liquid crystal display device according to the first embodiment of the present invention.

In FIG. 10, the dashed lines indicate the locations of source lines and gate lines to be formed in the subsequent processes.

In FIG. 12, the gate electrodes, the gate lines, and the conductive lines each have a laminate structure formed of a plurality of layers including a metal layer.

DESCRIPTION OF THE EMBODIMENTS

Figure 1:
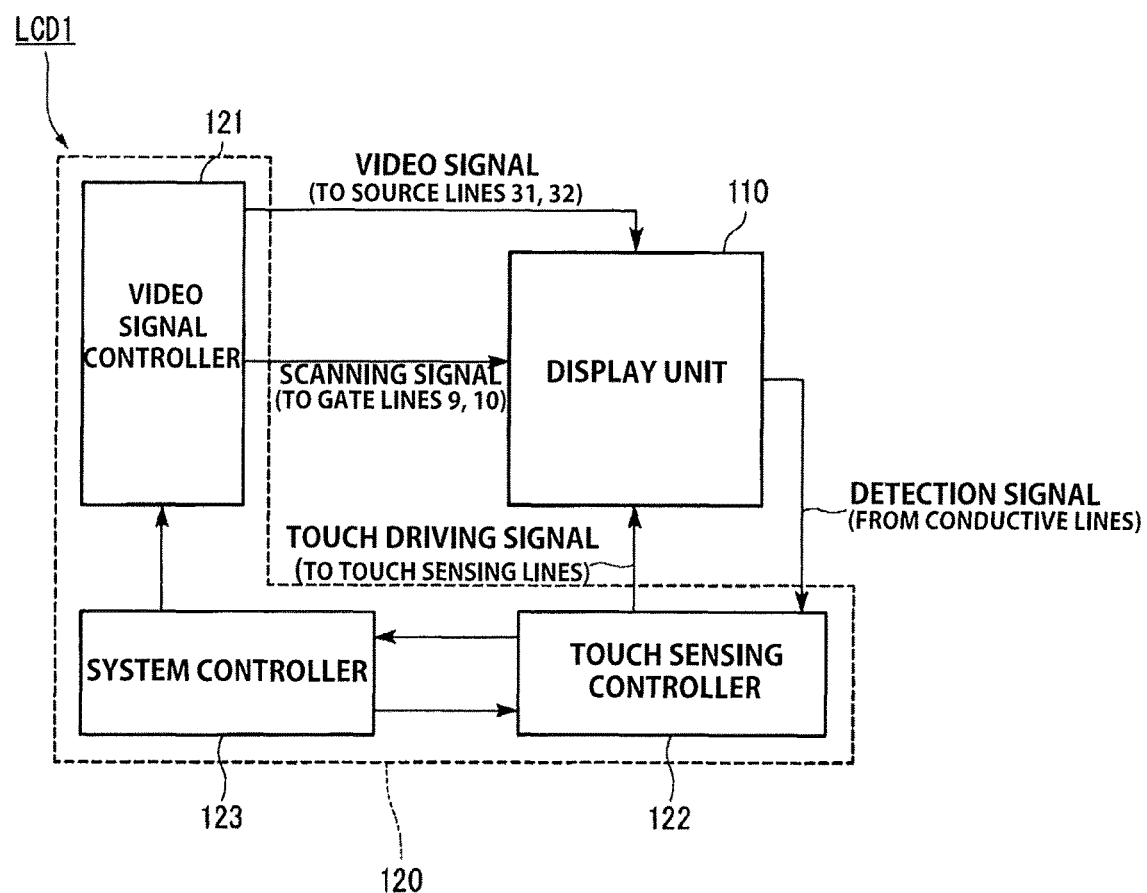
FIG. 1 is a block diagram of a control unit (video signal controller, system controller, and touch sensing controller) and a display unit constituting a liquid crystal display device according to a first embodiment of the present invention.

The embodiments will now be described with reference to the accompanying drawings, wherein like reference numerals designate corresponding or identical elements throughout the various drawings.

With reference to the drawings, description will be given of embodiments of the present invention.

In the following description, identical or substantially identical functions and components are given by identical reference signs to omit or simplify description, or description will be given only when necessary. To make the components be of an understandable size in the drawings, the dimensions and the proportions of the components are modified as needed. In addition, components difficult to illustrate are omitted, such as an insulating layer constituting a liquid crystal display device, a buffer layer, a plurality of layers that form a channel layer of a semiconductor, and a plurality of layers that form a conductive layer.

In the embodiments described below, description will be given of only characteristic parts of a liquid crystal display device to omit description of parts that are not different from components used, for example, in generally used liquid crystal display devices.

In the following description, lines, electrodes, and signals that are involved in touch sensing may be simply referred to as touch driving lines, touch detection lines, touch electrodes, and touch driving signals, respectively. The voltage applied to the touch sensing lines for touch sensing driving is referred to as the touch driving voltage, while the voltage applied across common electrodes and pixel electrodes is referred to as the liquid crystal driving voltage. Conductive lines may be referred to as common lines.

The liquid crystal display devices according to the embodiments of the present invention use an in-cell system. The in-cell system refers to a liquid crystal display device into which a touch sensing function is incorporated, or a liquid crystal display device with which a touch sensing function is integrated. In a liquid crystal display device in which a display device substrate and an array substrate (TFT substrate) are bonded together via a liquid crystal layer, a polarizing film is attached to an outer surface of each of the display device substrate and the array substrate. In other words, the in-cell liquid crystal display device of the present invention is a liquid crystal display device having an in-cell function at any part positioned between the two polarizing films and constituting the liquid crystal display device in the thickness direction.

First Embodiment (Functional Structure of Liquid Crystal Display Device LCD1)

With reference to FIGS. 1 to 19, a liquid crystal display device LCD1 according to a first embodiment of the present invention will now be described.

FIG. 1 is a block diagram illustrating a liquid crystal display device LCD1 according to the first embodiment of the present invention. As shown in FIG. 1, the liquid crystal display device LCD1 according to the present embodiment includes a display unit 110, and a control unit 120 for controlling the display unit 110 and the touch sensing function.

The control unit 120 has a known configuration, and includes a video signal controller 121 (first controller), a touch sensing controller 122 (second controller), and a system controller 123 (third controller).

The video signal controller 121 maintains common electrodes 17 (described later) provided on an array substrate 200 at a constant potential, and transmits a signal to gate lines 9, 10 (described later, scanning lines) provided on the array substrate 200 and source lines 31, 32 (described later, signal lines). When the video signal controller 121 applies a liquid crystal display driving voltage across the common electrodes 17 and pixel electrodes 20 (described later), fringe electric fields are created on the array substrate 200, and liquid crystal molecules are rotated to be parallel to the fringe electric fields, thereby driving the liquid crystal layer 300. An image is thus displayed on the array substrate 200. A video signal having AC rectangular waves, for example, is individually applied to the plurality of pixel electrodes 20 via the source lines (signal lines), with the common electrodes 17 being maintained at a constant potential. The AC rectangular waves may be positive or negative DC rectangular waves. As will be described later, the video signal controller 121 transmits a first video signal, which is negative, and a second video signal, which is positive, to the source lines.

The touch sensing controller 122 applies a touch sensing driving voltage to touch sensing lines 3 (described later) and detects a change in capacitance (fringe capacitance) that occurs between the touch sensing lines 3 and the common electrodes 17, for touch sensing operation.

The system controller 123 controls the video signal controller 121 and the touch sensing controller 122 to perform liquid crystal driving and capacitance change detection alternately or in a time-sharing manner. In addition, the system controller 123 controls signal supply to the touch sensing lines 3 performed by the touch sensing controller 122 in synchronization with the liquid crystal driving performed by the video signal controller 121.

In the liquid crystal display device LCD1 configured as shown in FIG. 1, the common electrodes 17 have a function of applying a liquid crystal display driving voltage across the common electrodes 17 and the pixel electrodes 20 to drive liquid crystal, and a touch sensing function of detecting a change in capacitance (fringe capacitance) that occurs between the touch sensing lines 3 and the common electrodes 17. The touch sensing lines according to the embodiments of the present invention can be formed of a highly conductive metal layer, so that the electrical resistance of the touch sensing lines is lower, for the enhancement of touch sensitivity (described later).

The control unit 120 configured as described above drives the liquid crystal layer 300 by applying a liquid crystal driving voltage across the pixel electrodes 20 and the common electrodes 17 in synchronization with the supply of the first video signal and the second video signal, as will be described later. In addition, the control unit 120 controls video display images, i.e., applies a voltage to the common electrode 17 after display of the images.

Further, the control unit 120 performs touch sensing driving using the touch sensing lines 3 and the common electrodes 17 during at least one of a stable image display period and a stable black display period following the image display, as will be described later.

(Structure of Liquid Crystal Display Device LCD1)

The liquid crystal display device of the present embodiment may include a display device substrate according to an embodiment described later. The term plan view set forth below refers to a plane as viewed in a direction of an observer observing a display surface of the liquid crystal display device (plane of the display device substrate). In the embodiments of the present invention, there is no limitation to the shape of the display unit of the liquid crystal display device, the shape of the pixel aperture that defines a pixel, and the number of pixels constituting the liquid crystal display device. In the embodiments detailed below, however, the liquid crystal display device will be described, defining, in plan view, the direction of the shorter side of the pixel aperture as being an X direction (second direction), the direction of the longer side (longitudinal direction) thereof as being a Y direction (first direction), and the thickness direction of the transparent substrate as being a Z direction. In the following embodiments, the liquid crystal display device may be configured with the X and Y directions defined above being switched with each other.

In FIGS. 2 to 19, the alignment film for initially aligning the liquid crystal layer 300, the optical films such as a polarizer film and an optical retardation film, and the protective cover glass, and other elements are omitted. The polarizer film is attached to the front and rear surfaces of the liquid crystal display device LCD1 so that the optical axis may be in a crossed Nicol state.

Figure 2:
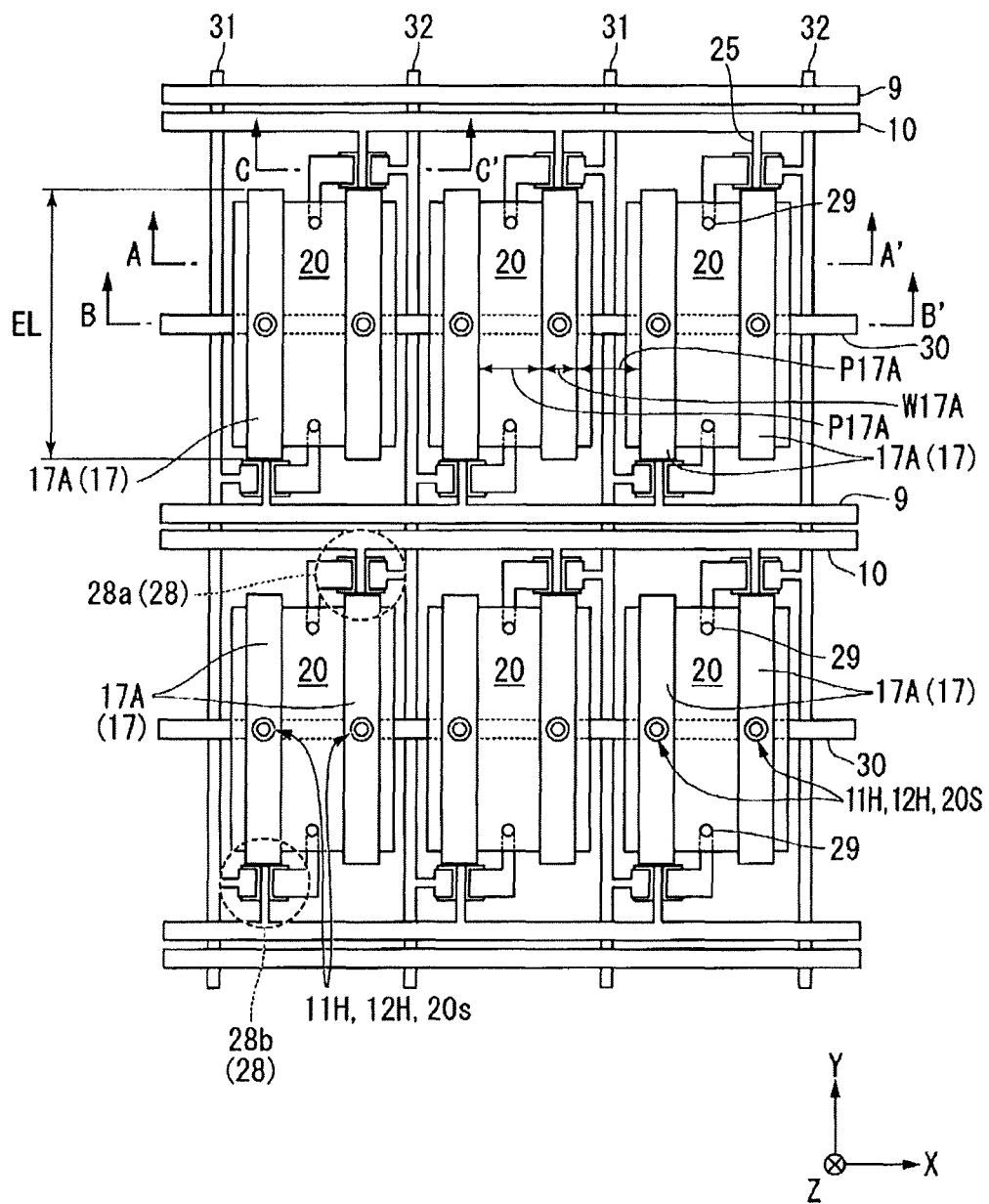
FIG. 2 is a partial plan view illustrating an array substrate constituting a liquid crystal display device according to the first embodiment of the present invention, as viewed from an observer.

FIG. 2 is a partial plan view illustrating an array substrate 200 constituting the liquid crystal display device LCD1 according to the first embodiment of the present invention, as viewed from an observer. In FIG. 2, a display device substrate facing the array substrate is omitted to clarify the structure of the array substrate.

The liquid crystal display device LCD1 includes source lines 31, 32 (first source lines 31 and second source lines 32), gate lines 9, 10 (first gate lines 10 and second gate lines 9), and common lines 30 on the array substrate 200. The first and second source lines 31, 32 are each formed so as to have a linear pattern extending in the Y direction (first direction). The first and second gate lines 10, 9, and the common lines 30 are each formed so as to have a linear pattern extending in the X direction (second direction). In other words, the first and second source lines 31, 32 are orthogonal to the gate lines 9, 10 and the common lines 30. The common lines 30 each extend in the X direction, crossing a plurality of pixel apertures. The plurality of pixel apertures correspond to areas defined on a transparent substrate 22.

The liquid crystal display device LCD1 also includes a plurality of pixel electrodes 20 arranged in a matrix and a plurality of active elements 28 (thin film transistors) provided in correspondence with and being connected to the pixel electrodes 20. The pixel electrodes 20 are provided in the respective plurality of pixel apertures. More specifically, two active elements 28 (first and second active element 28*a*, 28*b*) are connected to each of the plurality of pixel electrodes 20. In the example shown in FIG. 2, a first active element 28*a* is provided at the upper right end of each pixel electrode 20, and a second active element 28*b* is provided at the lower left end thereof.

Each first active element 28*a* includes a source electrode 24 (described later) connected to the second source line 32 or the first source line 31, a channel layer 27 (described later), a drain electrode 26 (described later), and a gate electrode 25 disposed facing the channel layer 27 via an insulating film (described later). The gate electrode 25 of the first active element 28*a* constitutes part of the first gate line 10 and is connected to the first gate line 10.

Each second active element 28*b* includes a source electrode 24 (described later) connected to the first source line 31 or the second source line 32, a channel layer 27 (described later), a drain electrode 26 (described later), and a gate electrode 25 disposed facing the channel layer 27 via an insulating film (described later). The gate electrode 25 of the second active element 28*b* constitutes part of the second gate line 9 and is connected to the second gate line 9.

In the present embodiment, the liquid crystal display device LCD1 includes a plurality of pixels, and one pixel electrode 20 forms one pixel. When the first and second active elements 28*a*, 28*b* are driven, a voltage (positive or negative) is applied to the plurality of pixel electrodes 20, which drives the liquid crystal. In the following description, the area where the corresponding pixel electrode 20 drives liquid crystal may be referred to as a pixel, a pixel aperture, or a pixel area. Each pixel is an area defined by the first source line 31, the second source line 32, the first gate line 10, and the second gate line 9 in plan view.

The liquid crystal display device LCD1 includes common electrodes 17 each provided at a position facing the corresponding one of the pixel electrodes 20 in the Z direction. In particular, two stripe-pattern common electrodes 17 are provided to a single pixel electrode 20. Each common electrode 17 provided to corresponding one of the plurality of pixel apertures has a constant potential. The common electrodes 17 extend in the Y direction and are parallel to the longitudinal direction of the pixel electrode 20. Each common electrode 17 has a length EL in the Y direction which is larger than the length of each pixel electrode 20 in the Y direction. Each common electrode 17 is electrically connected to the corresponding common line 30 through a through-hole 20S, a first contact hole 11H, and a second contact hole 12H, all of which will be described later. As shown in FIG. 2, the first and second contact holes 11H, 12H are located at the center of the common electrode 17 in the longitudinal direction of the conductive pattern (stripe-pattern electrode part 17A).

Each common electrode 17 has a line width W17A which is, for example, about 3 µm in the X direction. Adjacent common electrodes 17 have a pitch P17A (distance) therebetween which is, for example, about 4 µm. Specifically, the common electrodes 17 are separated from each other on a pixel and between adjacent pixels, at the pitch P17A in the X direction.

In the example shown in FIG. 2, two stripe-pattern common electrodes 17 are provided per pixel electrode 20, but the present invention is not limited to this configuration. Depending on the size of the pixel electrode 20, one or more common electrodes 17 may be provided. In this case, the line width W17A and the pitch P17A of the common electrodes 17 can be changed as appropriate according to pixel size and design.

Figure 3:
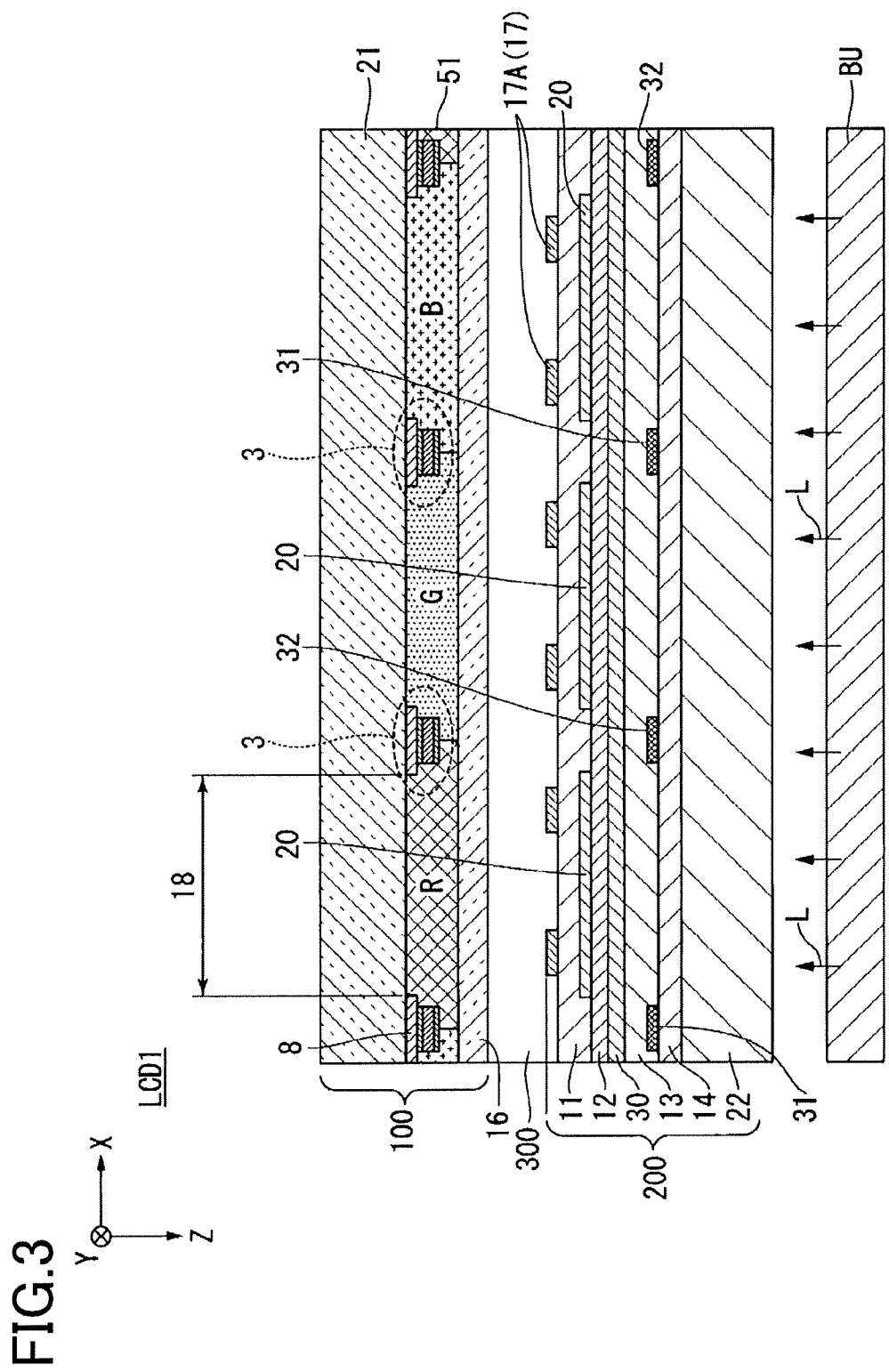
FIG. 3 is a partial cross-sectional view taken along the line A-A' of FIG. 2, illustrating the liquid crystal display device according to the first embodiment of the present invention.

FIG. 3 is a partial cross-sectional view taken along the line A-A' of FIG. 2, illustrating the liquid crystal display device LCD1 according to the first embodiment of the present invention. In particular, FIG. 3 is a cross-sectional view along the shorter side direction of the pixel apertures.

Figure 4B:
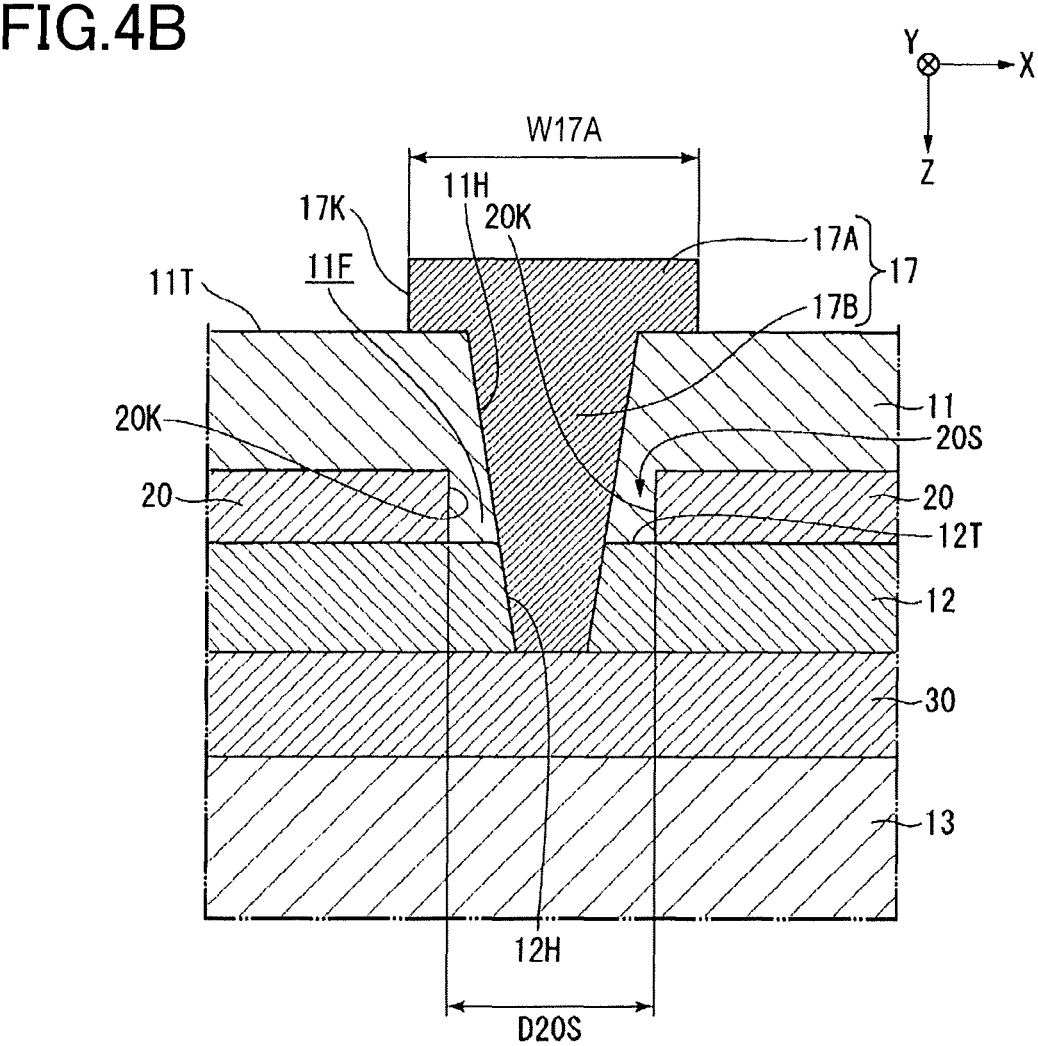
FIG. 4B is a partially enlarged cross-sectional view illustrating a liquid crystal display device according to the first embodiment of the present invention, that is, illustrating an enlarged common electrode.

FIG. 4A is a partial cross-sectional view taken along the line B-B' of FIG. 2, illustrating the liquid crystal display device LCD1 according to the first embodiment of the present invention. FIG. 4B is a partial cross-sectional view illustrating the liquid crystal display device LCD1 according to the first embodiment of the present invention, that is, illustrating an enlarged common electrode.

Figure 5:
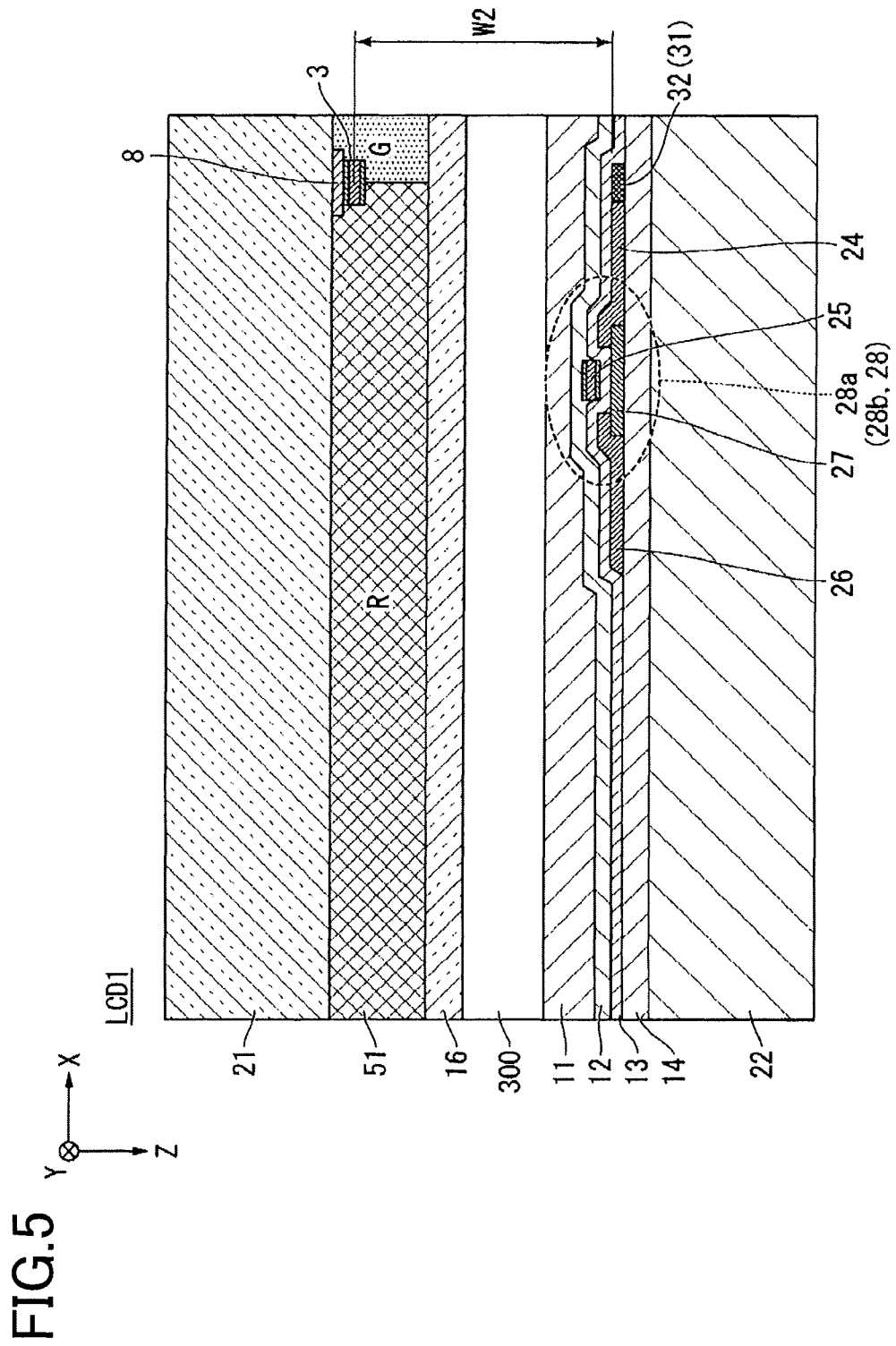
FIG. 5 is a partial cross-sectional view taken along the line C-C' of FIG. 2, illustrating the liquid crystal display device according to the first embodiment of the present invention.

FIG. 5 is a partial cross-sectional view taken along the line C-C' of FIG. 2, illustrating the liquid crystal display device LCD1 according to the first embodiment of the present invention.

The liquid crystal display device LCD1 includes a display device substrate 100 (counter substrate), an array substrate 200 bonded so as to face the display device substrate 100, and a liquid crystal layer 300 sandwiched between the display device substrate 100 and the array substrate 200.

The array substrate 200 constituting the liquid crystal display device LCD1 has a rear surface (transparent substrate surface of the array substrate 200 on a side opposite to the surface on which the liquid crystal layer 300 is provided) which is provided with a backlight unit BU for supplying light L to the inside of the liquid crystal display device LCD1. The backlight unit may be provided on lateral surfaces of the liquid crystal display device LCD1. In this case, the rear surface of the transparent substrate 22 of the array substrate 200 is provided, for example, with a reflection plate for reflecting emission light of the backlight unit BU toward the inside of the liquid crystal display device LCD1, a light guide plate, a light diffusion plate, and other members.

(Display Device Substrate 100)

The display device substrate 100 includes a transparent substrate 21 (first transparent substrate), touch sensing lines 3 provided on the transparent substrate 21, color filters 51 (RGB) formed covering the touch sensing lines 3, and a transparent resin layer 16 formed covering the color filters 51.

The touch sensing lines 3 act as touch driving electrodes (touch drive lines). The liquid crystal display device LCD1 detects touch sensing by detecting a change in capacitance between the touch sensing lines 3 and the common electrodes 17.

Each touch sensing line 3 has a laminate structure formed of a conductive layer at least including a black layer 8 and a metal layer 5 formed above the black layer 8. The conductive layer has a three-layer structure made up of a first conductive metal oxide layer 6, the metal layer 5, and a second conductive metal oxide layer 4.

The metal layer 5 held between the first and second conductive metal oxide layers 6, 4 may have a layer structure from which either or both of the conductive oxide layers are omitted. A black layer may be additionally laminated on the first conductive metal oxide layer 6.

(Metal Layer 5)

The metal layer 5 may be, for example, a copper layer or a copper-containing layer that is a copper alloy layer, or may be an aluminum alloy layer (aluminum-containing layer) that contains aluminum. Specifically, the material of the metal layer 5 may be copper, silver, gold, titanium, molybdenum, aluminum, or an alloy thereof. Nickel, which is a ferromagnetic material, can be formed into a film by a vacuum film formation method such as sputtering, although the film formation rate is low. Chromium has disadvantages of being potentially hazardous to the environment and having a larger electrical resistance, but is usable as a material of the metal layer according to the present embodiment. The metal used for forming the metal layer 5 in terms of adhesiveness to the transparent substrate 21 and the transparent resin layer 16 may preferably be an alloy obtained by adding one or more metal elements selected from magnesium, calcium, titanium, molybdenum, indium, tin, zinc, neodymium, nickel, aluminum and antimony, to copper or aluminum. The amount of metal element added to the metal layer 5 is preferably 4 at % or less because this amount will not significantly lower the resistance of the copper alloy or aluminum. The method of forming the copper alloy film may, for example, be sputtering and other vacuum film formation methods.

A copper alloy thin film or aluminum alloy thin film with a thickness of 100 nm or more, or 150 nm or more, will transmit almost no visible light. The metal layer 5 of the present embodiment can obtain sufficient light-shielding properties if it has a thickness in the range, for example, of 100 nm to 300 nm. The metal layer 5 may have a thickness exceeding 300 nm. As will be described later, the material of the metal layer 5 may be applied to the common lines 30 (conductive lines). In addition, the laminate structure where the metal layer 5 is held by the conductive metal oxide layers may also be applied to the common lines 30 (conductive lines).

(Conductive Metal Oxide Layers 4, 6)

The first and second conductive metal oxide layers 6, 4 hold the metal layer 5. Materials usable for such a conductive metal oxide layer may be metals other than copper, such as nickel, zinc, indium, titanium, molybdenum, and tungsten, or an alloy of these metals.

Specifically, examples of the material usable for the second and first conductive metal oxide layers 4, 6 include composite oxides of an indium oxide, a zinc oxide, and a tin oxide.

The amount of indium (In) contained in the second and first conductive metal oxide layers 4, 6 requires to be more than 80 at %. The amount of indium (In) is preferably more than 80 at %, and more preferably more than 90 at %. An amount of indium (In) of less than 80 at % is not preferred because it causes a large specific resistance in the resultant conductive metal oxide layer. An amount of zinc (Zn) of more than 20 at % is not preferred because it makes the conductive metal oxide (mixed oxide) less alkali-resistant. In the second and first conductive metal oxide layers 4, 6 set forth above, all these amounts are indicated by atomic percent of a metal element in a mixed oxide (ratio of only metal elements without the oxygen element being counted).

The amount of zinc (Zn) contained in the first and second conductive metal oxide layer 6, 4 requires to be more than the amount of tin (Sn). An amount of tin exceeding that of zinc may hamper wet etching in a post-process. In other words, the metal layer, which is made of a copper or copper alloy, is more likely to be etched than the conductive metal oxide layer, and accordingly the line width tends to be different between the first conductive metal oxide layer 6, the metal layer 5, and the second conductive metal oxide layer 4.

The amount of tin (Sn) in the first and second conductive metal oxide layers 6, 4 is preferably in the range of 0.5 at % or more to 6 at % or less. In comparison to indium element, addition of a 0.5 at % or more to 6 at % or less amount of tin to the conductive metal oxide layer can reduce the specific resistance of a ternary mixed oxide film (conductive composite oxide layer) made of the indium, zinc, and tin mentioned above. The amount of tin exceeding 7 at % entails addition of zinc to the conductive metal oxide layer, so that the specific resistance of the ternary mixed oxide film (conductive composite oxide layer) will be excessively large. By adjusting the amount of zinc and tin within the above range (0.5 at % or more to 6 at % or less), the specific resistance can be limited to a small range of about $5\times10^{-4}$ Ωcm or more to $3\times10^{-4}$ Ωcm or less as a specific resistance of a single layer film of the mixed oxide film. A small amount of other elements such as titanium, zirconium, magnesium, aluminum, germanium, and the like may be added to the mixed oxide.

If the metal layer 5 is a copper layer or copper alloy layer, the conductive metal oxide layer mentioned above is preferably a composite oxide made of an indium oxide, a zinc oxide, and a tin oxide. Such a copper layer or copper alloy layer is poorly adhesive to the transparent resin layer 16 and a glass substrate (transparent substrate 21) constituting the color filters 51. If the copper layer or the copper alloy layer is applied to the display device substrate as it is, it will be difficult to produce a practical display device substrate. However, the composite oxide mentioned above is sufficiently adhesive to the color filters 51, the black matrix BM (black layer 8), the glass substrate (transparent substrate 21) and other components, and also sufficiently adhesive to the copper layer and the copper alloy layer. Accordingly, if a copper layer or copper alloy layer that contains a composite oxide is applied to the display device substrate, a practical display device substrate can be produced.

Generally, copper, copper alloys, oxides thereof, and nitride are not sufficiently adhesive to the substrate 21 such as a glass substrate or the black matrix BM and other components. In the absence of a conductive metal oxide layer, peeling may be caused at the interface between the touch sensing lines 3 and the transparent substrate 21 such as a glass substrate, or at the interface between the touch sensing lines 3 and the black layer 8. Use of copper or a copper alloy as the touch sensing lines 3 of thin line patterns is not practically applicable to a display device substrate where no conductive metal oxide layer is formed as a primer layer of the metal layer 5 (copper or copper alloy). This is because use of copper or a copper alloy invites not only the potential defect due to peeling, but also the potential defect due to electrostatic discharge (ESD) damage in the touch sensing lines 3 during the process of manufacturing the display device substrate. Such ESD damage in the touch sensing lines 3 is a phenomenon in which static electricity accumulates in the line patterns as a result of post-processes such as of laminating the color filters 51 on the transparent substrate 21, bonding the display device substrate to the array substrate together, cleaning, and the like, and thus ESD damage causes pattern damage, disconnection and the like.

In addition, there is a concern that non-conductive copper oxide may be formed on the surface of the copper layer or the copper alloy layer over time, resulting in poor electrical contact. On the other hand, a composite oxide layer made such as of indium oxide, zinc oxide, or tin oxide can achieve stable ohmic contact and facilitate electrical implementation such as the transfer described below. In a sealing part where the display device substrate and the array substrate are bonded together, transfer of electrical conduction can be carried out from the display device substrate 100 to the array substrate 200 in the thickness direction of the sealing part. By providing the sealing part with a conductor selected from an anisotropic conductive film, fine metal balls, and resin spheres covered with a metal film, the display device substrate 100 and the array substrate 200 are electrically conducted.

The following structure may be applied to the metal oxide layers 4, 6 and a metal layer 5 in the embodiments of the present invention. For example, the structure may be a layer structure obtained by forming, for example, ITO (indium tin oxide) or IZTO (indium zinc tin oxide, Z is zinc oxide) containing indium oxide as a main base material in an oxygen-deficient state, on a metal layer of a copper alloy layer, or a layer structure obtained by laminating molybdenum oxide, tungsten oxide, a mixed oxide of nickel oxide and copper oxide, titanium oxide, and others on a metal layer of an aluminum alloy or a copper alloy. A layer structure obtained using a metal oxide layer and a metal layer has an advantage that it can be successively formed with a sputtering device or other vacuum film-forming device.

(Black Layer 8)

The black layer 8 acts as a black matrix BM of the liquid crystal display device LCD1. The black layer is made of, for example, a colored resin in which a black colorant is dispersed. It is true that copper oxide or copper alloy oxide does not provide low reflectivity or a sufficiently black color, but keeps the reflectance of visible light almost at 3% or less at the interface between the black layer and the substrate, such as a glass substrate, of the present embodiment to provide high visibility.

Materials usable as the black colorant include carbon, carbon nanotubes, or a mixture of a plurality of organic pigments. For example, carbon may be used at a ratio of 51 mass % or more relative to the total amount of colorants, that is, used as a main colorant. Blue, red, or other organic pigments may be added to the black colorant to adjust the reflected color. For example, carbon concentration in a photosensitive black coating liquid as a starting material may be adjusted (carbon concentration may be lowered) to improve reproducibility of the black layer.

Even use of a large exposure device, that is, a device for manufacturing a liquid crystal display device, can form (pattern) the black layer with patterns where the line width is in the range of 1 to 6 µm (fine lines). The carbon concentration in the present embodiment is set to the range of 4 mass % or more to 50 mass % or less relative to the total solid content including a resin or a hardening agent and a pigment. The carbon concentration may exceed 50 mass % relative to the total solid content, but excessive concentration tends to lower coating suitability. If the carbon concentration is set to 4 mass % or less, a sufficiently black color is not obtained, and reflected light that occurs in the primer metal layer located underneath the black layer is visually recognized to be larger, possibly lowering visibility.

When performing exposure treatment in the subsequent process of photolithography, the target substrate is aligned with the mask. In this case, for example, giving a higher priority to the alignment between the substrate and the mask, the optical density of the black layer resulting from transmission measurement may be set to 2 or less. The black layer may be formed using a mixture of a plurality of organic pigments, besides carbon, for adjustment of the black color. Considering a refractive index (approximately 1.5) of the base material, such as glass or transparent resin, the reflectance of the black layer is set such that the reflectance at the interface between the black layer and the base material will be 3% or less. In this case, it is desirable to adjust the amount and type of the black colorant, the resin to be used in the colorant, and the thickness of the resin. Optimizing these conditions, reflectance can be retained at 3% or less in the wavelength range of visible light, at the interface between the base material, such as glass, having a refractive index of approximately 1.5, and the black layer, thereby achieving a low reflectance. The reflectance of the black layer is desirably 3% or less in terms of the need to prevent re-reflection of the reflected light that is attributed to the light emitted from the backlight unit BU, and better visibility for the observer. Normally, the refractive index of the acrylic resins used for color filters and that of the liquid crystal material is in the range of approximately 1.5 or more to 1.7 or less.

Forming light-absorbent metal oxide on the touch sensing lines 3 or the conductive lines (common lines 30), light reflection can be reduced or eliminated which is caused by the metal layer 5 of the touch sensing lines 3.

The display device substrate 100 shown in FIG. 3 has a structure including the color filters 51, but the color filters 51 may be omitted. For example, the display device substrate 100 may have a structure where the touch sensing lines 3 are provided on the transparent substrate 21 and the transparent resin layer 16 is formed covering the touch sensing lines 3.

In a liquid crystal display device that uses a display device substrate having no color filters 51, the backlight unit is provided with red LEDs, green LEDs, and blue LEDs to display colors by a field sequential approach. The layer structure of each touch sensing line 3 provided on the transparent substrate 21 shown in FIG. 3 may be identical to the layer structure of each common line 30 (conductive line) formed on the array substrate 200 or the layer structure of each gate electrode 25 (gate lines 9, 10), both of which will be described later.

(Array Substrate 200)

As shown in FIGS. 3, 4A, and 4B, the array substrate 200 includes: a transparent substrate 22 (second transparent substrate); a fourth insulating layer 14 formed covering a surface of the transparent substrate 22; first source lines 31 and second source lines 32 formed on the fourth insulating layer; a third insulating layer 13 formed on the fourth insulating layer 14 to cover the first and second source lines 31, 32; first gate lines 10 and second gate lines 9 formed on the third insulating layer 13; common lines 30 formed on the third insulating layer 13; a second insulating layer 12 formed on the third insulating layer 13 to cover the first and second gate lines 10, 9, and the common lines 30; pixel electrodes 20 formed on the second insulating layer 12; a first insulating layer 11 formed on the second insulating layer 12 to cover the pixel electrodes 20; and common electrodes 17.

Materials that can be used for forming the first, second, third and fourth insulating layers 11, 12, 13 and 14 include silicon oxide, silicon oxynitride, aluminum oxide, aluminum oxynitride, hafnium oxide, and mixed materials containing these materials. These insulating layers 11, 12, 13 and 14 may have a single-layer structure or a multilayer structure where a plurality of layers are laminated. These insulating layers 11, 12, 13 and 14 can be formed by use of a film formation device such as for plasma CVD or sputtering.

The first and second source lines 31, 32 are provided between the third and fourth insulating layers 13, 14. The first and second source lines 31, 32 are formed of the same conductive material and through the same process. The first and second source lines 31, 32 may have a structure of multiple conductive layers. In the first embodiment, a three-layer structure of titanium/aluminum alloy/titanium is used for the first and second source lines 31, 32. The aluminum alloy is aluminum-neodymium alloy.

The same material as that of the metal layer 5 mentioned above is used as the material for forming the common line 30. Similarly, the same structure as that of the metal layer 5 is used as the structure of the common line 30.

The pixel electrodes 20 are respectively provided to a plurality of pixel apertures 18, and are connected to active elements (described later), i.e., thin-film transistors (TFTs). The active elements are arranged in a matrix in the array substrate 200, and accordingly the pixel electrodes 20 are arranged in a matrix on the array substrate 200. The pixel electrodes 20 are each formed of a transparent conductive film such as of ITO.

(Structure of Common Electrode 17)

Referring to FIG. 4B, the structure of each common electrode 17 and components of the array substrate 200 located around the common electrode 17 will be described. In particular, description will be given of a laminate structure including the common line 30, the common electrode 17, the pixel electrode 20, the first insulating layer 11, and the second insulating layer 12. FIG. 4B shows a main part of a pixel forming the array substrate 200, that is, the structure of a single common electrode 17 in a single pixel.

The structure of the common electrode 17 shown in FIG. 4B is used in all the pixels in the array substrate 200.

The second insulating layer 12 is provided under the first insulating layer 11, that is, formed on the common line 30, and has a second contact hole 12H. The first insulating layer 11 is provided under a top part (electrode part 17A) of the common electrode 17, that is, formed on the pixel electrode 20, and has a first contact hole 11H. The second contact hole 12H is in alignment with the first contact hole 11H. The diameter (width in the X direction) of the first contact hole 11H gradually decreases in a direction (Z direction) from an upper surface 11T of the first insulating layer 11 toward the common line 30. Similarly, the diameter (width in the X direction) of the second contact hole 12H gradually decreases in a direction (Z direction) from the upper surface 12T of the second insulating layer 12 toward the common line 30. In other words, the first and second contact holes 11H, 12H are tapered.

The pixel electrode 20 is formed under the first insulating layer 11 and has a through-hole 20S. The through-hole 20S is an aperture where there is no transparent conductive film. The through-hole 20S is provided being in alignment with the first and second contact holes 11H, 12H. The through-hole 20S corresponds to an inner space surrounded by an inner wall 20K provided to the pixel electrode 20. The through-hole 20S has a diameter D20S that is larger than the diameters of the first and second contact holes 11H, 12H. The first contact hole 11H is provided inside the through-hole 20S. The through-hole 20S is filled with the first insulating layer 11 to form a filled part 11F through which the first contact hole 11H is formed. The second contact hole 12H is formed below the through-hole 20S so as to be continuous from the first contact hole 11H. The number of the through-holes 20S formed in the pixel electrode 20 is the same as that of the first contact holes 11H. The diameter D20S of the through-hole 20S may be in the range, for example, of 3 μm to 6 μm.

The common electrode 17 includes the electrode part 17A (conductive part) and a conductive connecting part 17B.

The electrode part 17A is formed on the upper surface 11T of the first insulating layer 11, and is arranged overlapping with the through-hole 20S of the pixel electrode 20 as viewed in the Z direction. The electrode part 17A is provided on a surface of the array substrate 200 so as to be closest to the liquid crystal layer 300. Specifically, an alignment film is formed between the liquid crystal layer 300 and the array substrate 200, and the first insulating layer 11 is provided under the alignment film.

The electrode part 17A has a line width W17A which is, for example, approximately 3 μm that is larger than an upper end of the conductive connecting part 17B (connecting part between the electrode part 17A and the conductive connecting part 17B).

The conductive connecting part 17B is provided inside the first and second contact holes 11H, 12H and electrically connected therethrough to the common line 30.

The electrode part 17A and the conductive connecting part 17B are integrally formed onto the first insulating layer 11 through a film formation process and a patterning process, in a state where the contact holes described above are formed in the first and second insulating layers 11 and 12. Similar to the pixel electrode 20, the common electrode 17 is formed of a transparent conductive film such as of ITO.

In the laminate structure described above, the first insulating layer 11 is provided between the electrode part 17A and the pixel electrode 20, and the second insulating layer 12 is provided between the common line 30 and the pixel electrode 20. In this state, the common electrode 17 and the common line 30 are electrically conducted to each other and have the same potential.

In the liquid crystal display device LCD1 of the present embodiment, the common electrodes 17 have a constant potential. The term constant potential in the present invention refers, for example, to the potential of the common electrodes 17 grounded to the casing of the liquid crystal display device through high resistance. The term does not refer, for example, to a ±2.5 V constant potential for normal frame inversion driving, but to a constant potential fixed to approximately 0 V (zero volt) within the range equal to or lower than a threshold voltage Vth of liquid crystal. In other words, the constant potential may be one that is offset from an intermediate value of a liquid crystal driving voltage, as long as it falls within the Vth range. The term high resistance refers to a resistance that can be selected from the range of 500 megaohms to 50 teraohms. For example, such a resistance may typically be selected from the range of 500 gigaohms to 5 teraohms. In the present embodiment, each common line 30 is grounded through a high resistance, for example, of 1 teraohm, and is at a constant potential of approximately 0 V (zero volt). Similarly, each common electrode 17 connected to the common line 30 is also at a constant potential of approximately 0 V (zero volt).

When an oxide semiconductor such as of IGZO is used as a material for forming the channel layer of the active elements (thin film transistors) of the liquid crystal display device, a resistance lower than 1 teraohm may be used to alleviate the state where the pixels are likely to be stuck. The high resistance mentioned above can be adjusted to adjust a time constant associated with touch sensing. Display devices using an oxide semiconductor such as of IGZO for the channel layer of the active elements can be designed in various ways as described above in terms of touch sensing control. In the following description, oxide semiconductor may simply be referred to as IGZO.

(Active Element 28)

Referring now to FIG. 5, a structure of the active elements 28 connected to the pixel electrode 20 will be described.

In FIG. 5, a structure of the first active element 28a is illustrated as an example. Description of the structure of the second active element 28b is omitted because it is identical to that of the first active element 28a.

Each active element 28 includes a channel layer 27, a drain electrode 26 connected to an end of the channel layer 27 (first end that is the left end of the channel layer 27 in FIG. 5), a source electrode 24 connected to the other end of the channel layer 27 (second end that is the right end of the channel layer 27 in FIG. 5), and a gate electrode 25 arranged facing the channel layer 27 via the third insulating layer 13. In FIG. 5, the channel layer 27, the drain electrode 26, and the source electrode 24 constituting the active element 28 are formed on the fourth insulating layer 14, but the present invention is not limited to this structure. The active element 28 does not have to be formed on the fourth insulating layer 14 but may be formed on the transparent substrate 22.

The source electrode 24 and the drain electrode 26 shown in FIG. 5 are respectively formed of identically configured conductive layers through the same process. In the first embodiment, a three-layer structure of titanium/aluminum alloy/titanium is used for the source electrode 24 and the drain electrode 26. The aluminum alloy is aluminum-neodymium alloy.

For example, the material used for the channel layer 27 may be an oxide semiconductor called IGZO. The material used for the channel layer 27 may be an oxide semiconductor containing two or more metal oxides of gallium, indium, zinc, tin, aluminum, germanium and cerium. In the present embodiment, an oxide semiconductor containing indium oxide, gallium oxide, and zinc oxide is used. The material of the channel layer 27 formed of an oxide semiconductor may have any form of single crystal, polycrystal, fine crystal, fine crystal mixed with amorphous, and sheer amorphous. The oxide semiconductor may have a thickness selectively determined within the range of 2 nm to 50 nm. The channel layer 27 may be formed of a polysilicon semiconductor.

The drain electrode 26 and the source electrodes 24 (source lines 31, 32) may have the same structure. For example, multiple conductive layers may be used for the drain electrode 26 and the source electrodes 24. For example, these electrodes may have a structure in which a layer made of aluminum, copper, or an alloy thereof is sandwiched between films made of molybdenum, titanium, tantalum, tungsten, conductive metal oxide, and the like. The drain electrode 26 and the source electrode 24 may be formed on the fourth insulating layer 14 in advance, followed by laminating the channel layer 27 on these two electrodes. The transistors may each have a double-gate structure or other multi-gate structure.

The third insulating layer 13 acts as a gate insulating film. The material used for such an insulating film may be silicon oxide, gallium oxide, aluminum oxide, silicon nitride, silicon oxynitride, aluminum oxynitride, or the like. The third insulating layer 13 may be a single-layer film, a mixed film, or a multilayer film. The mixed film or multilayer film may be formed of a material selected from the insulating film materials mentioned above. The third insulating layer 13 may have a thickness selected from the range, for example, of 2 nm or more to 300 nm or less. When the channel layer 27 is formed of an oxide semiconductor, the interface between the third insulating layer 13 and the channel layer 27, which are in contact with each other, can be formed in an oxygen-rich conditions (film formation atmosphere).

The gate electrode 25 is provided on the channel layer 27 via the third insulating layer 13. The gate electrode 25 (first and second gate lines 10, 9) can be formed using the same material and through the same process as those of the common line 30 mentioned above so as to have the same layer structure. The gate electrode 25 may be formed using the same materials as those of the drain electrode 26 and the source electrode 24 mentioned above so as to have the same layer structure. When the gate electrode 25 is formed of multiple layers of conductive materials, a copper layer or a copper alloy layer may be held between conductive metal oxides. Prior to forming the gate electrode 25, only the third insulating layer 13 located right above the channel layer 27 of the active element 28 may be dry-etched, for example, to make the third insulating layer 13 thinner.

Specifically, however, the third insulating layer 13 needs to be thickened to reduce or prevent intrusion of noise into the common line 30. The noise in this case is caused by the video signals supplied to the first and second source lines 31, 32. In particular, it is preferable that the third insulating layer 13 is thick in parts where the common line 30 is orthogonal to the first and second source lines 31, 32. The third insulating layer 13, on the other hand, is required to be appropriately thick in consideration of switching characteristics of the active element 28 because the third insulating layer 13 acts as a gate insulating film, being located between the gate electrode 25 and the channel layer 27. Accordingly, the insulating layer 13 is made thin at the part right above the channel layer 27, while retaining the large thickness at parts located between the common line 30 and the first source line 31 and between the common line 30 and the second source line 32. Thus, the two contradictory functions described above can be achieved, i.e., reducing or preventing intrusion of noise caused by the video signals supplied to the source lines into the common line 30, and obtaining desired switching characteristics in the active element 28.

The channel layer 27 may be separately provided with a light-shielding film via an insulating layer it. The material used for the light-shielding film may be a refractory metal, such as molybdenum, titanium, or chromium.

The first gate line 10 is permitted to establish electrical linkage with the first active element 28a. Specifically, the first gate electrode 25a connected to the first gate line 10 faces the channel layer 27 of the first active element 28a via the third insulating layer 13. The first active element 28a is switch-driven in response to a scanning signal supplied from the video signal controller 121 to the first gate electrode 25a.

The second gate line 9 is permitted to establish electrical linkage with the second active element 28b. Specifically, the second gate electrode 25b connected to the second gate line 9 faces the channel layer 27 of the second active element 28b via the third insulating layer 13. The second active element 28b is switch-driven in response to a scanning signal supplied to the second gate electrode 25b from the video signal controller 121.

A voltage as a video signal is applied to the first source line 31 and the second source line 32 from the video signal controller 121. A negative potential video signal (first video signal) is applied to the first source line 31, and a positive potential video signal (second video signal) is applied to the second source line 32. The positive and negative polarities of the video signals in the first and second source lines 31, 32 are fixed, and not inverted. Liquid crystal driving, with the positive and negative polarities of the video signals being fixed in the source lines 31, 32, will be described later with reference to FIGS. 14 and 15.

When a copper alloy is used as part of the structure of the gate electrode 25, the copper alloy may contain metallic or metalloid elements in the range of 0.1 at % or more to 4 at % or less relative to copper. The addition of such elements to copper can achieve an effect of reducing or preventing copper migration. It is particularly preferred to add the following elements to copper. These elements are: those which can be replaced with part of copper atoms in the crystals (grains) of the copper layer so as to be placed at lattice positions of the copper; and those which precipitate at crystal boundaries of the copper layer to prevent movement of copper atoms in the vicinity of the copper grains. Alternatively, it is preferred to add elements that are heavier (having larger atomic weight) than the copper atoms to the copper to prevent movement of the copper atoms. Also, it is preferred to select additive elements which are unlikely to lower the conductivity of copper, at an additive amount in the range of 0.1 at % to 4 at % relative to copper. Further, considering vacuum film formation, such as sputtering, it is preferred that the elements have a film forming rate, such as in sputtering, close to that of copper. The above technique for adding elements to copper can also be applied to the case where copper is replaced by silver or aluminum. In other words, silver or aluminum alloy may be used instead of a copper alloy.

Addition of an element to copper for replacement of part of the copper atoms in crystals (grains) of the copper layer so as to be placed at copper lattice positions can mean addition of metal or metalloid to copper that forms a solid solution with copper at around ambient temperature. Examples of the metal that easily forms a solid solution with copper include manganese, nickel, zinc, palladium, gallium, and gold (Au). Addition of an element that precipitates at crystal boundaries of the copper layer to prevent movement of copper atoms in the vicinity of the copper grains can mean addition of metal or metalloid to copper that does not form a solid solution with copper at around ambient temperature. Examples of the metal or metalloid that is unlikely to form a solid solution with copper include: refractory metals such as titanium, zirconium, and molybdenum, and elements called metalloids such as silicon, germanium, antimony, and bismuth.

Copper is unreliable due to migration. Addition of the metal or metalloid mentioned above to copper can compensate for the reliability concern. Addition of 0.1 at % or more of the metal or metalloid to copper can achieve the effect of inhibiting migration. Addition of 4 at % or more of the metal or metalloid to copper, however, causes copper conductivity to significantly deteriorate, and thus there is no benefit of selecting copper or copper alloy.

Examples of the conductive oxide include composite oxides (mixed oxides) of one or more selected from indium oxide, tin oxide, zinc oxide, and antimony oxide. Such a composite oxide may further contain an addition of a small amount of titanium oxide, zirconium oxide, aluminum oxide, magnesium oxide, and germanium oxide. The composite oxide of indium oxide and tin oxide called ITO is commonly known as a low-resistance transparent conductive film. When using a ternary composite oxide of indium oxide, zinc oxide, and tin oxide, the mixing ratio of the zinc oxide and the tin oxide is adjusted to adjust the rate when wet-etched. In a three-layer structure in which an alloy layer is sandwiched by the ternary composite oxides of indium oxide, zinc oxide, and tin oxide, the etching rate of the composite oxide and the etching rate of the copper alloy layer can be adjusted, so that the pattern widths of the three layers can be substantially equalized.

To provide gradation display, in general, voltage of various levels corresponding to gradation display is applied to the source lines, and video signals are applied to the source lines at various time points. Noise caused by such video signals easily intrudes into the common electrodes 17, possibly reducing accuracy of detecting touch sensing. In this regard, use of a structure, as shown in FIG. 5, having an increased distance W2 between the source lines 32 (or source lines 31) and the touch sensing lines 3 can achieve the effect of reducing the noise.

The present embodiment uses top-gate transistors as the active elements 28. Transistors having a bottom-gate structure may be used in place of the top-gate structure. However, use of transistors having a top-gate structure allows the source lines 31 to be spaced away from the touch sensing lines 3 in the Z direction. In other words, transistors having a top-gate structure can separate the source lines from the capacitance-generated space between the touch sensing lines 3 and the common electrodes 17. Separation of the source lines from the capacitance-generated space can reduce the influence of noise on the touch signals. The noise in this case is detected between the touch sensing lines 3 and the common electrodes 17, and attributed to various video signals generated from the source lines.
(Specific Structure of Display Device Substrate 100)

Figure 6:
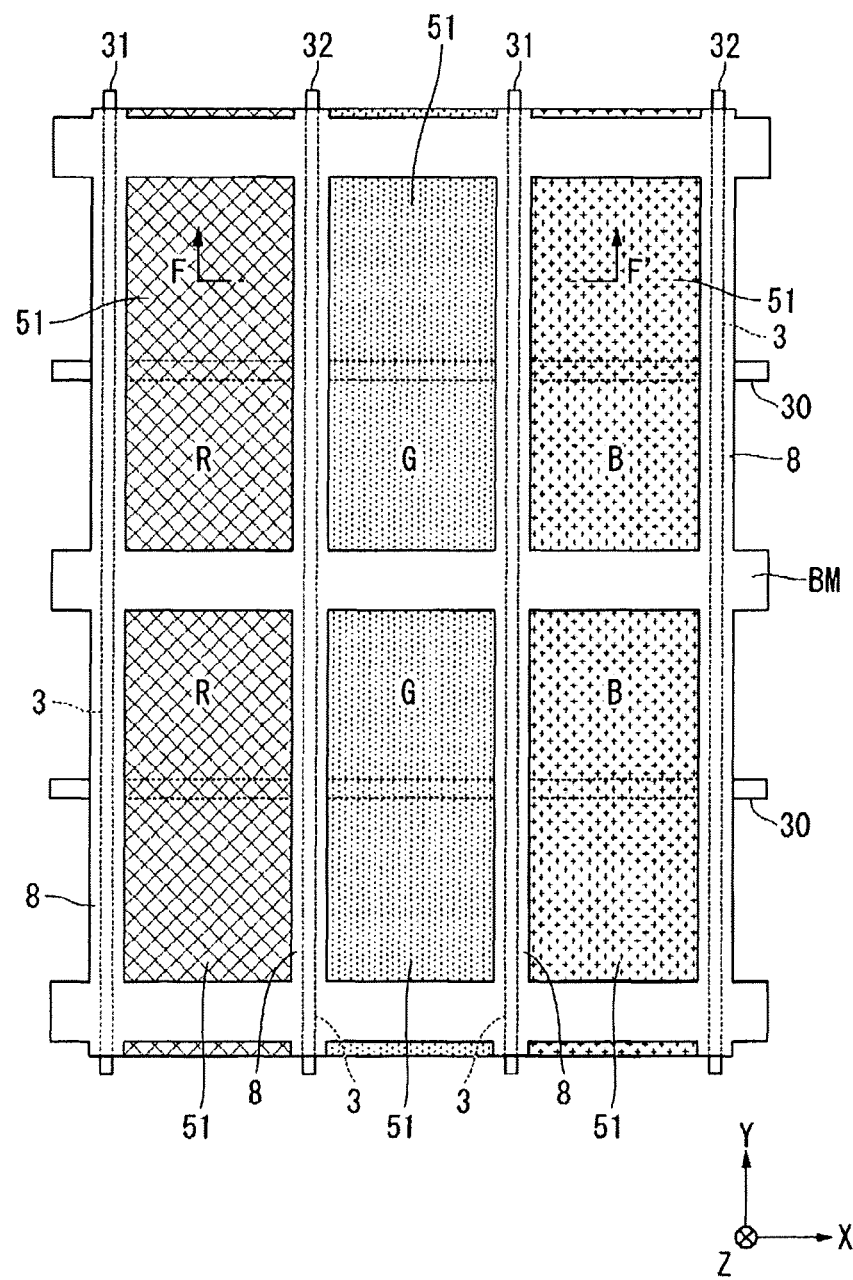
FIG. 6 is a partial plan view illustrating a liquid crystal display device according to the first embodiment of the present invention, that is, illustrating a structure in which a display device substrate having color filters and touch sensing lines are laminated on the array substrate illustrated in FIG. 2 via a liquid crystal layer.

Referring to FIGS. 6 to 9, description will be given of a specific structure of the display device substrate 100. FIG. 6 is a schematic plan view illustrating the liquid crystal display device LCD1 according to the first embodiment of the present invention, as viewed from an observer through the transparent substrate 21.

Figure 7:
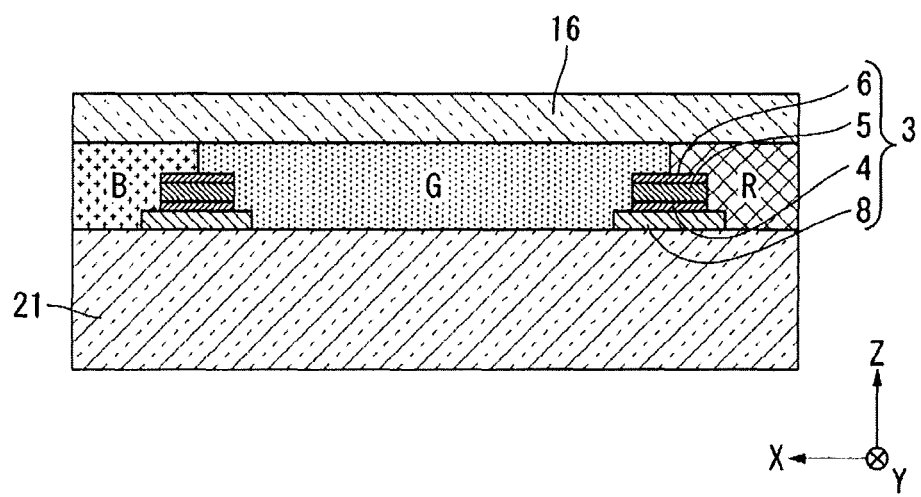
FIG. 7 is a partial cross-sectional view taken along the line F-F' of FIG. 6, illustrating a display device substrate according to the first embodiment of the present invention.
Figure 8:
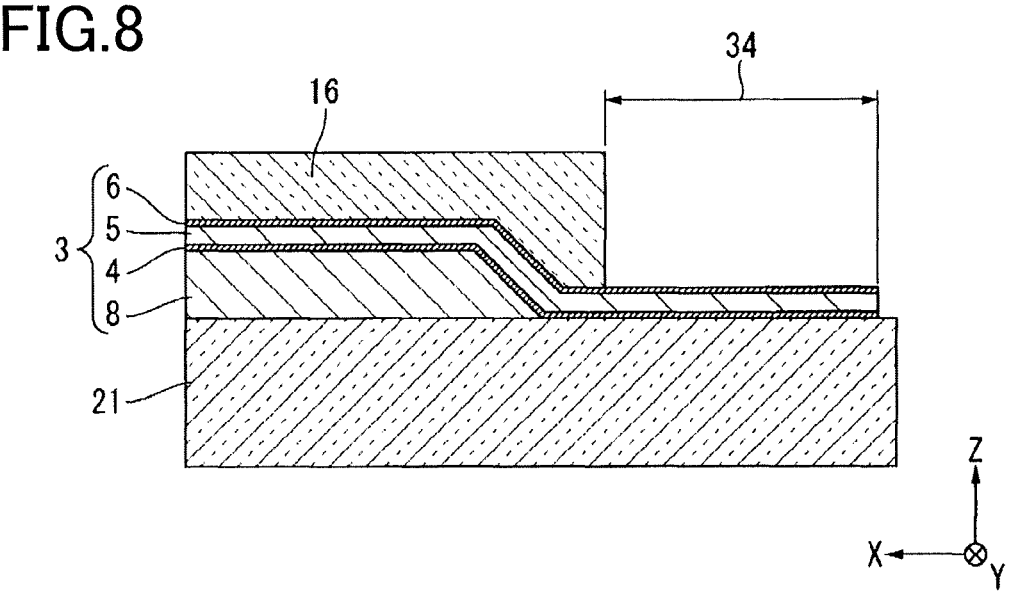
FIG. 8 is a partial cross-sectional view illustrating a display device substrate according to the first embodiment of the present invention, that is, illustrating a terminal part of a touch sensing line.
Figure 9:
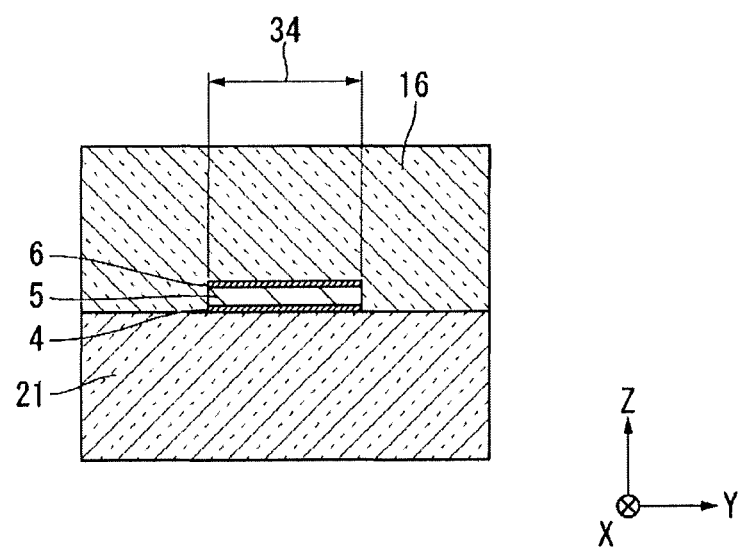
FIG. 9 is a partial cross-sectional view illustrating a display device substrate according to the first embodiment of the present invention, that is, illustrating a terminal part of a touch sensing line.

FIG. 7 is a partial cross-sectional view taken along the line F-F' of FIG. 6, illustrating the display device substrate 100 according to the first embodiment of the present invention. FIG. 8 is a partial cross-sectional view illustrating the display device substrate 100 according to the first embodiment of the present invention, that is, illustrating a terminal part 34 of a touch sensing line 3. FIG. 9 is a partial cross-sectional view illustrating the display device substrate 100 according to the first embodiment of the present invention, that is, illustrating the terminal part 34 of a touch sensing line 3.

As shown in FIG. 6, the display device substrate 100 is laminated on the array substrate 200 shown in FIG. 2 via a liquid crystal layer. As a result of the lamination, there is provided a liquid crystal display device LCD1 in which the display device substrate 100 is bonded to the array substrate 200 via the liquid crystal layer 300.

In FIG. 6, some components of the array substrate 200, namely the first source lines 31, the second source lines 32, and the common lines 30 are shown, but the rest of the components (electrodes, lines, active elements, etc.) are omitted.

The display device substrate 100 includes the color filters 51 (RGB), the touch sensing lines 3, and a black matrix BM. The black matrix BM has a lattice pattern provided with a plurality of pixel apertures. The plurality of pixel apertures are provided with red filters (R), green filters (G), and blue filters (B) that constitute the color filters 51. The black matrix BM has X-direction extensions extending in the X direction and Y-direction extensions extending in the Y direction, and is formed of a material constituting the black layer 8 described above. The Y-direction extensions correspond to the black layer 8. The touch sensing lines 3 are provided on the display device substrate 100 so as to overlap (part of) the respective Y-direction extensions of the black matrix BM (see FIG. 7).

The touch sensing lines 3 are formed on the black matrix BM and linearly extend in the Y direction. In the positional relationship between the display device substrate 100 and the array substrate 200, the touch sensing lines 3 are arranged overlapping the first source lines 31 and the second source lines 32, and extend orthogonally to the direction in which the common lines 30 extend.

As shown in FIG. 7, the touch sensing lines, each having a three-layer structure of a first conductive metal oxide layer, a copper alloy layer, and a second conductive metal oxide layer, are laminated on the black layer 8 constituting the black matrix BM.

Materials that can be used for the conductive metal oxide layer include an indium oxide- or tin oxide-based conductive metal oxide. Examples of the conductive metal oxide include a composite oxide obtained by doping an indium oxide with zinc oxide, tin oxide, titanium oxide, zirconium oxide, magnesium oxide, aluminum oxide, germanium oxide, gallium oxide, cerium dioxide, or antimony oxide. When a composite oxide with which zinc oxide is mixed is used, wet etching rate can be adjusted according to the amount of the zinc oxide added to the indium oxide.

When forming the three-layer touch sensing lines or the conductive lines (common lines 30 formed on the array substrate 200) each made up of the first conductive metal oxide layer, the copper alloy layer, and the second conductive metal oxide layer mentioned above, it is important to equalize the etching rate between the conductive metal oxide and the copper alloy and etch them with substantially an identical line width. A necessary element, such as another metal oxide that can improve conductivity or reliability, may be added to the main binary material of indium oxide and zinc oxide to achieve the lines each having the three-layer structure.

For example, a composite oxide that is a composite metal oxide made up of indium oxide-zinc oxide-tin oxide is highly conductive and highly adhesive to copper alloys, color filters, a glass substrate, and the like. This composite metal oxide is a hard ceramic and provides a good ohmic contact in an electrical mounting structure. A conductive oxide layer containing such a composite oxide may be applied to the three-layer structure made up of the first conductive metal oxide layer, the copper alloy layer, and the second conductive metal oxide layer to achieve an extremely robust electrical implementation, for example, on a glass substrate.

As shown in FIG. 7, a second conductive metal oxide layer 4, a metal layer 5, and a first conductive metal oxide layer 6 can be successively formed on the matrix BM to form each of the three layers. The second and first conductive metal oxide layers 4, 6 are each formed of a ternary mixed oxide film (conductive metal oxide layer) containing indium oxide, zinc oxide, and tin oxide. The film is successively formed using, for example, a sputtering device with a vacuum atmosphere being maintained.

The second and first conductive metal oxide layers 4, 6 contain the following compositions of the indium oxide, the zinc oxide, and the tin oxide, and the metal layer that is a copper alloy. The following compositions each show an atomic percent of metal elements in the mixed oxide (Only metal elements are counted, with oxygen elements being uncounted. The atomic percent is hereinafter represented as at %).

First conductive metal oxide layer; In:Zn:Sn=90:8:2
Second conductive metal oxide layer; In:Zn:Sn=91:7:2
Metal layer; Cu:Zn:Sb=98.6:1.0:0.4

The first and second conductive metal oxide layers 6, 4 require to contain more than 80 at % of indium (In). The amount of indium (In) is preferably more than 80 at %, and more preferably more than 90 at %. The amount of indium (In) is preferably more than 90 at %. Less than 80 at % indium is not preferred because it results in a large specific resistance in the resultant conductive metal oxide layer. An amount of zinc (Zn) of more than 20 at % is not preferred because it makes the conductive metal oxide (mixed oxide) less alkali-resistant.

The amount of zinc (Zn) contained in the first and second conductive metal oxide layer 6, 4 requires to be more than the amount of tin (Sn). An amount of tin exceeding that of zinc may hamper wet etching in a post-process. In other words, the metal layer, which is a copper or copper alloy, is more likely to be etched than the conductive metal oxide layer, and accordingly the line width tends to be different between the first conductive metal oxide layer 6, the metal layer 5, and the second conductive metal oxide layer 4.

The amount of tin (Sn) in the first and second conductive metal oxide layers 6, 4 is preferably in the range of 0.5 at % or more to 6 at % or less. In comparison to the indium element, addition of tin at 0.5 at % or more to 6 at % or less to the conductive metal oxide layer can reduce the specific resistance of a ternary mixed oxide film (conductive composite oxide layer) made of the indium, zinc, and tin mentioned above. Tin exceeding 7 at % entails addition of zinc to the conductive metal oxide layer, so that the specific resistance of the ternary mixed oxide film (conductive composite oxide layer) will be excessively large. By adjusting the amount of zinc and tin within the above range (0.5 at % or more to 6 at % or less) and adjusting film formation conditions, annealing conditions and other conditions, the specific resistance can be limited to a small range of about $5 \times 10^{-4}$ Ωcm or more to $3 \times 10^{-4}$ Ωcm or less as a specific resistance of a single layer film of the mixed oxide film. A small amount of other elements such as titanium, zirconium, magnesium, aluminum, germanium, and the like may be added to the mixed oxide.

The black matrix BM has a frame area surrounding a matrix area (a rectangular display area and a display screen) within a display surface (display unit 110). Preferably, the touch sensing lines 3 are formed on the transparent substrate 21 so as to extend from the frame area toward the outside of the transparent substrate 21, and terminal parts 34 are formed on the respective touch sensing lines 3 located outside the frame area. In this case, the terminal parts 34 of the touch sensing lines 3 are provided, without overlapping the black matrix BM, at extension portions protruding from the frame area. This configuration enables direct formation of the terminal parts 34 used for implementation on the glass surface of the transparent substrate 21 that is a glass plate.

FIG. 8 is a cross-sectional view taken along the X direction, illustrating a touch sensing line 3 extending from the black matrix BM in the frame area toward the outside of the transparent substrate 21. The terminal part 34 of the touch sensing line 3 is directly disposed on the transparent substrate 21 that is a glass plate. FIG. 9 is a cross-sectional view taken along the Y direction, illustrating the terminal part 34.

The terminal part is not limited to have the shape shown in FIGS. 8 and 9. For example, the terminal part 34 may be covered with the transparent resin layer 16, followed by removing the top part of the terminal part 34, and then the terminal part 34 may be formed into a circular or rectangular shape, with the conductive metal oxide layer being exposed to the surface of the terminal part 34. In this case, at the sealing part where the display device substrate 100 and the array substrate 200 are bonded together and at ends inside the liquid crystal cells, electrical conduction can be transferred from the display device substrate 100 to the array substrate 200 in the thickness direction of the sealing part. By providing the sealing part with a conductor selected from an anisotropic conductive film, fine metal balls, and resin spheres covered with a metal film, the display device substrate 100 and the array substrate 200 are electrically conducted.

In the structure having conduction between the display device substrate 100 and the array substrate 200, it is preferred that the terminal parts each having the three layers of the first conductive metal oxide layer 6, the copper alloy layer (the metal layer 5), and the conductive metal oxide layer 4 are provided not only to the display device substrate 100, but also to the array substrate 200. The terminal parts thus formed on the array substrate 200 are used as terminals for transferring electrical conduction to the display device substrate 100. More specifically, either the structure of the conductive layer forming each gate line 9 or 10 on the array substrate 200, or the structure of the conductive layer forming each source line 31 or 32 may be imparted with the three-layer structure of the first conductive metal oxide layer, the copper alloy layer, and the second conductive metal oxide layer. As a result, routing lines and terminal parts for establishing electrical conduction between the display device substrate 100 and the array substrate 200 will be formed on the array substrate 200.

(Liquid Crystal Layer 300)

Referring again to FIG. 3, the liquid crystal layer 300 will be described.

The liquid crystal layer 300 includes liquid crystal molecules 39 having positive dielectric anisotropy. Initial alignment of the liquid crystal molecules is horizontal to the surface of the display device substrate 100 or the array substrate 200. Liquid crystal driving according to the first embodiment by use of the liquid crystal layer 300 may be referred to as a transverse electric field mode because driving voltage is applied to the liquid crystal molecules, traversing the liquid crystal layer in plan view. How the liquid crystal molecules 39 behave will be described later with reference to FIGS. 16 and 17.

(How to Manufacture Liquid Crystal Display Device LCD1)

Referring to FIGS. 10 to 13, description will be given of how to manufacture the liquid crystal display device LCD1 including the array substrate 200 having the pixel structure shown in FIGS. 2 to 5.

Firstly, a transparent substrate 22 is prepared to form a fourth insulating layer 14 covering a surface of the transparent substrate 22.

Figure 10:
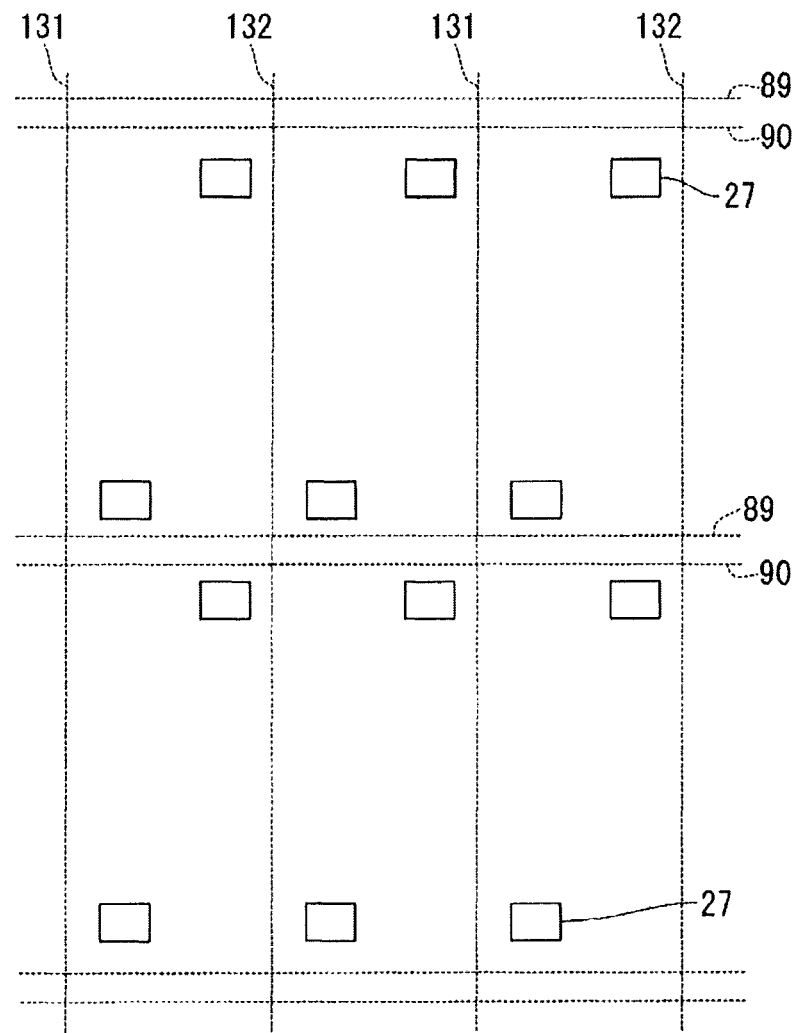
FIG. 10 is a partial plan view illustrating an array substrate according to the first embodiment of the present invention, that is, illustrating a process of manufacturing the array substrate, that is, illustrating channel layer patterns each being a component of an active element.

Then, as shown in FIG. 10, a channel layer 27 is formed on the fourth insulating layer 14 to constitute active elements 28. As the material for the channel layer 27, an oxide semiconductor is used. The channel layer 27 is patterned so as to provide two channel layers 27 per pixel. In FIG. 10, the dashed lines 131, 132, 89, and 90 are shown. The dashed lines 131 and 132 indicate where source lines are formed on the fourth insulating layer 14 after the channel layers 27 are formed. The dashed lines 89 and 90 indicate where gate lines are formed on the third insulating layer 13 after the source lines 31, 32 are formed.

Figure 11:
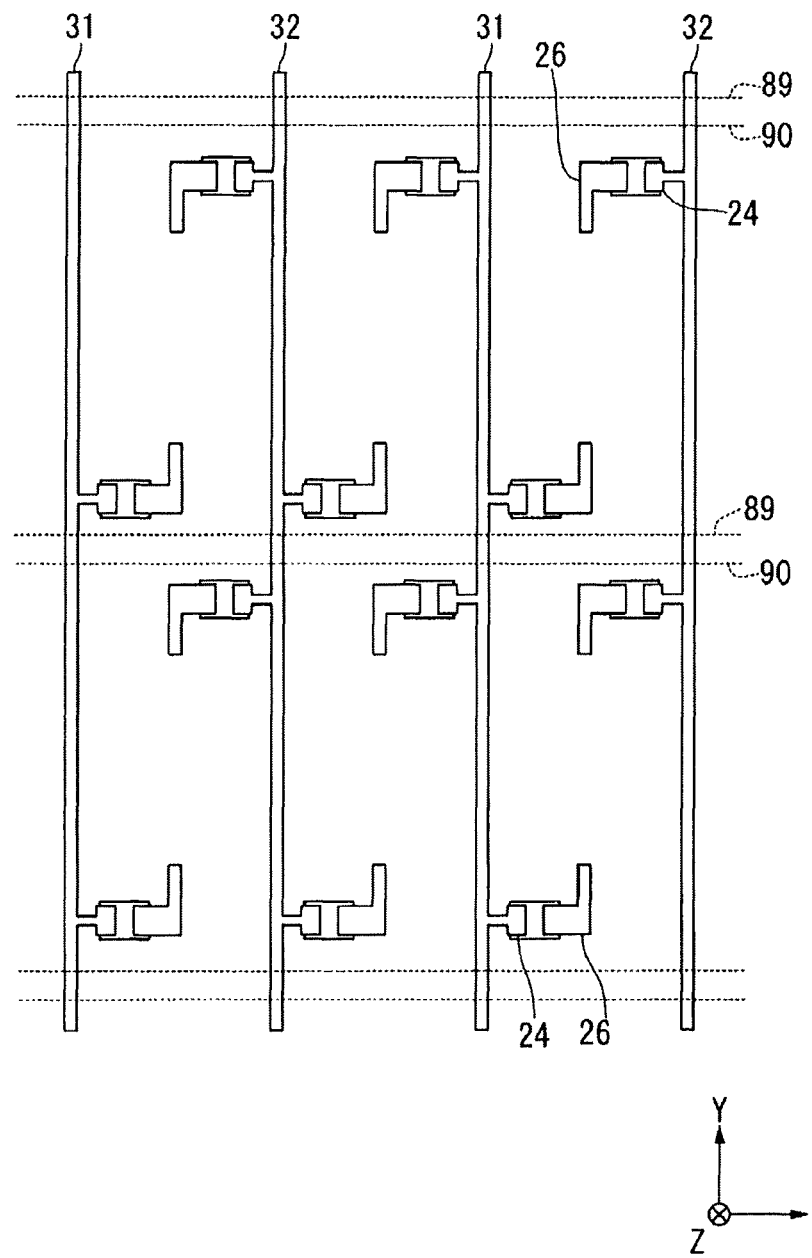
FIG. 11 is a partial plan view illustrating an array substrate according to the first embodiment of the present invention, that is, illustrating a process of manufacturing the array substrate, that is, illustrating a structure in which patterns of source lines, source electrodes, and drain electrodes are formed on the channel layer.

Then, as shown in FIG. 11, source electrodes 24 and drain electrodes 26 are formed on the respective channel layers 27, while first source lines 31 and second source lines 32 are formed to establish electrical linkage with the source electrodes 24. The first and second source lines 31, 32 each have a linear pattern extending in the Y direction.

Then, a third insulating layer 13 is formed on the transparent substrate 22, i.e., on the fourth insulating layer 14, covering the channel layers 27, the source electrodes 24, the drain electrodes 26, the first source lines 31, and the second source lines 32. The third insulating layer 13 acts as an interlayer insulating film located between two wiring layers and as a gate insulating film.

Figure 12:
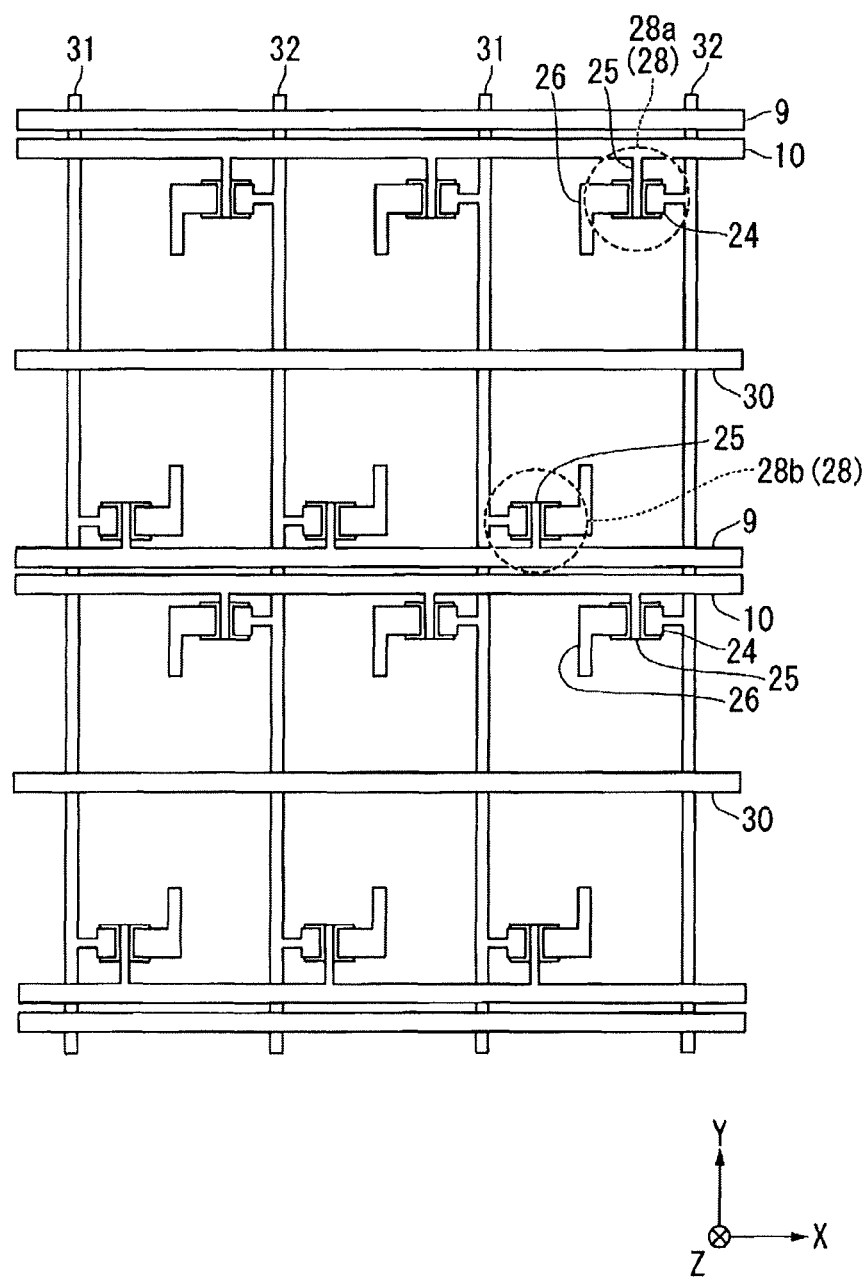
FIG. 12 is a partial plan view illustrating an array substrate according to the first embodiment of the present invention, that is, illustrating a process of manufacturing the array substrate, that is, illustrating a structure in which patterns of gate electrodes, gate lines, and conductive lines are formed on the substrate via a gate insulating film.

Subsequent to the formation of the third insulating layer 13, as shown in FIG. 12, gate electrodes 25 are formed on the third insulating layer 13 so as to match the respective positions where the channel layers 27 are formed. Along with the formation of the gate electrodes 25, first gate lines 10 and second gate lines 9 are formed to establish electrical linkage with the gate electrodes 25, and also common lines 30 are formed. As described above, the gate electrode 25, the first gate lines 10, the second gate lines 9, and the common lines 30 are conductive layers each made of a conductive material through the same process.

Then, a second insulating layer 12 is formed on the transparent substrate 22, i.e., on the third insulating layer 13, covering the gate electrodes 25, the first gate lines 10, the second gate lines 9, and the common lines 30. After the second insulating layer 12 is formed, a transparent conductive film is formed on the overall surface of the second insulating layer 12.

Figure 13:
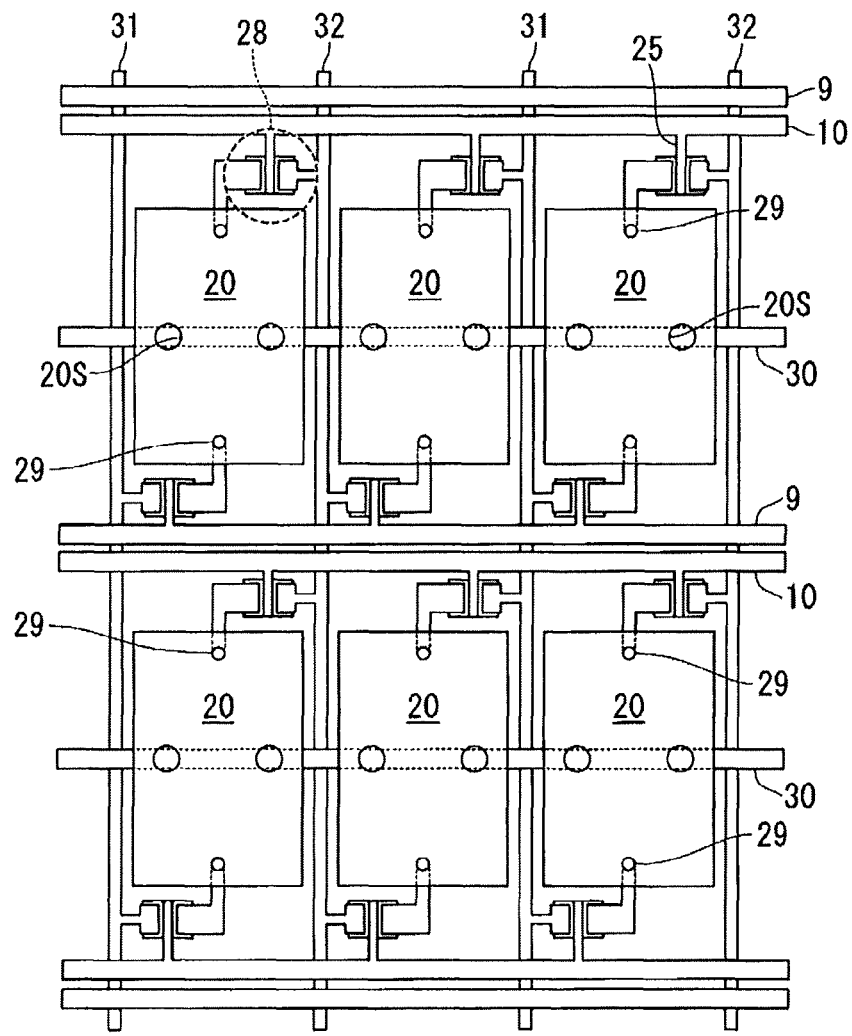
FIG. 13 is a partial plan view illustrating an array substrate according to the first embodiment of the present invention, that is, illustrating a process of manufacturing the array substrate, that is, illustrating a structure in which pixel electrode patterns are formed on the substrate via an insulating film. The laminate structure in which common electrodes are formed on the array substrate shown in FIG. 13 via the insulating layer corresponds to the structure shown in FIG. 2.

Then, the transparent conductive film is patterned to form a pixel electrode 20 for each pixel, as shown in FIG. 13. When the pixel electrodes 20 are patterned, through-holes 20S are also formed. In other words, the transparent conductive film is removed from the through-holes 20S.

FIG. 13 shows a structure in which the second insulating layer 12 has been formed covering the active elements 28, the first source lines 31, the second source lines 32, the first gate lines 10, the second gate lines 9, the common lines 30, and the like. On the second insulating layer 12, the pixel electrodes 20 are formed by patterning. Each pixel electrode 20 is electrically connected to the drain electrodes 26 of a first active element 28a and a second active element 28b through respective contact holes 29. Each through-hole 20S formed in the pixel electrode 20 has a diameter larger than the diameter of the first contact hole 11H and a second contact hole 12H that will be formed in a later process. The through-hole 20S is large enough (has a diameter that is large enough) not to cause electrical leakage between the common electrode 17 and the common line 30, inside the first contact hole 11H or the second contact hole 12H.

Then, a first insulating layer 11 is formed on the transparent substrate 22, i.e., on the second insulating layer 12. Thus, the first insulating layer 11 buries the through-holes 20S and covers the overall surface of the pixel electrode 20. Thereafter, at positions corresponding to the through-holes 20S, the first contact holes 11H are formed in the first insulating layer 11, and the second contact holes 12H are formed on the second insulating layer 12. The first and second insulating layers 11, 12 are etched to collectively form the first and second contact holes 11H, 12H.

After that, a transparent conductive film, which is the material forming the common electrodes 17, is formed on the first insulating layer 11 so as to fill the first and second contact holes 11H, 12H. Then, the transparent conductive film is patterned to form the electrode parts 17A shown in FIG. 4B on the first insulating layer 11, while burying the conductive connecting parts 17B in the first and second contact holes 11H, 12H, thereby forming the common electrodes 17. Thus, electrical conduction is established between the common electrodes 17 and the common lines 30. Through the processes set forth above, the array substrate 200 shown in FIG. 2 is provided.

In the example shown in FIG. 2, the common electrodes 17 are formed on the first insulating layer 11 which is formed covering the pixel electrode 20. Although two common electrodes 17 shaped into a stripe pattern are provided per pixel, the pattern shape and the number of the common electrodes 17 are not limited to these. The common electrodes 17 are each formed of a transparent conductive film such as of ITO. The common electrodes 17 are electrically connected to the corresponding common line 30 through the first and second contact holes 11H, 12H at the center of the pixel in the longitudinal direction. The portions where the common electrodes 17 overlap the respective pixel electrodes 20 may be used for auxiliary capacitance for carrying out liquid crystal display.

The method of manufacturing the liquid crystal display device LCD1 described above eliminates the need to provide jumper lines, bypass tunnels and the like even when the source lines or the gate lines for driving the active elements are provided on a single array substrate. Therefore, the liquid crystal display device LCD1 can be manufactured at low cost.

(How Liquid Crystal Display Device LCD1 Works)

Figure 14:
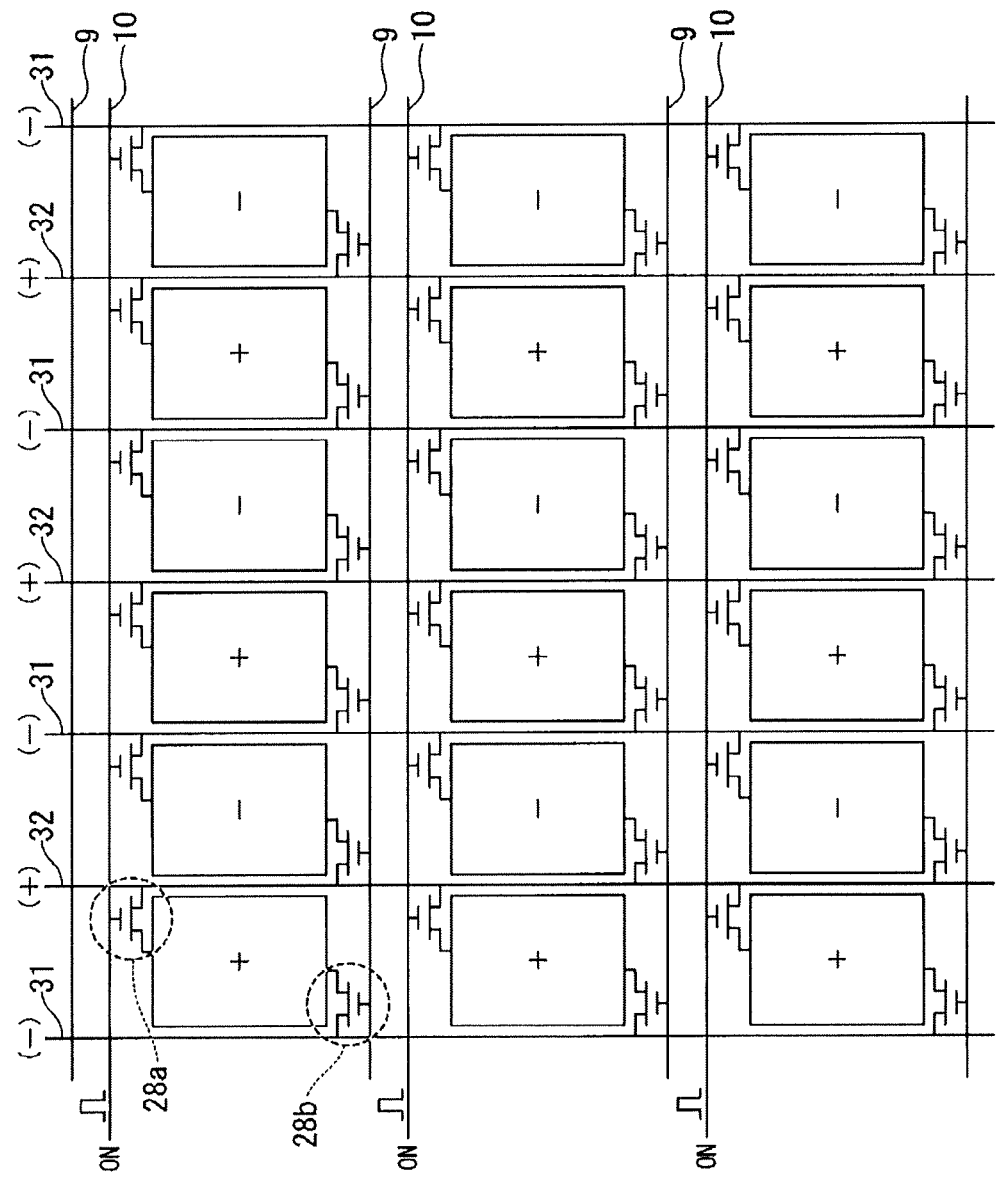
FIG. 14 is a partial circuit diagram illustrating a liquid crystal display device according to the first embodiment of the present invention, that is, illustrating a state of liquid crystal driving voltage in individual pixels when the liquid crystal display device is column inversion-driven.
Figure 15:
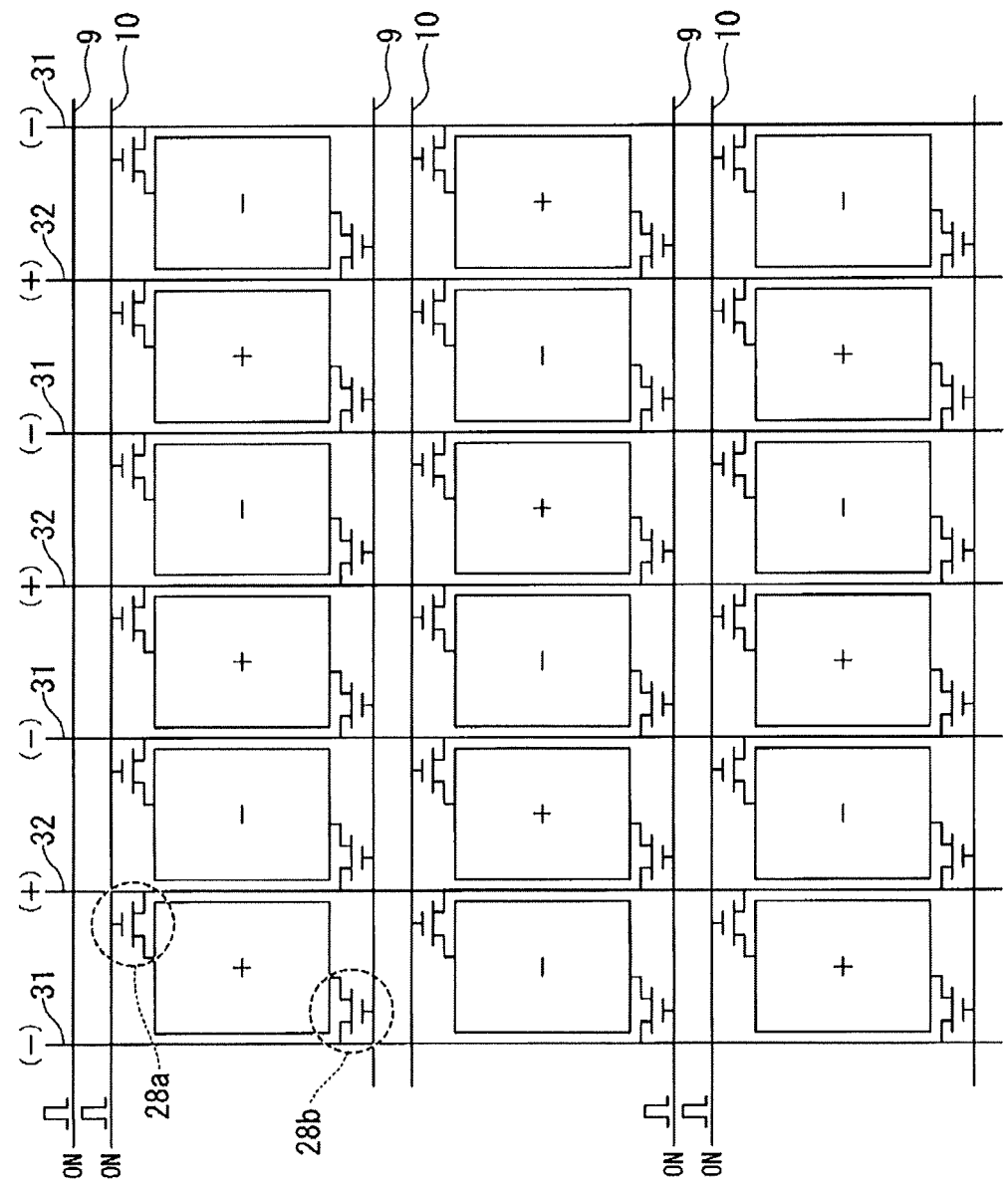
FIG. 15 is a partial circuit diagram illustrating a liquid crystal display device according to the first embodiment of the present invention, that is, illustrating a state of liquid crystal driving voltage in individual pixels when the liquid crystal display device is column inversion-driven.

Referring to FIGS. 14 and 15, description will be given of inversion driving carried out by the gate lines 9, 10 and the source lines 31, 32, and more specifically of a method of driving liquid crystals by column inversion driving and dot inversion driving. FIG. 14 is a partial circuit diagram illustrating a liquid crystal display device LCD1 according to the first embodiment of the present invention, that is, illustrating a state of liquid crystal driving voltage in each pixel when the liquid crystal display device is column inversion-driven. FIG. 15 is a partial circuit diagram illustrating a liquid crystal display device LCD1 according to the first embodiment of the present invention, that is, illustrating a state of liquid crystal driving voltage in each pixel when the liquid crystal display device is dot inversion-driven.

In the present embodiment, as an example, the second source lines 32 have a potential of positive polarity, the first source lines 31 have a potential of negative polarity, and pixel inversion driving is carried out on individual pixels. Gate lines may be selected all over the display screen for frame inversion driving. Alternatively, a half of all the gate lines may be selected, or horizontal lines may be sequentially or intermittently selected for inversion driving.

FIG. 14 shows, for example, polarities of the pixels when the even-number gate lines 10 are selected from the plurality of gate lines 10 (multiple lines) to send gate signals to the active elements. As shown, the polarity of the second source lines 32 is positive and the polarity of the first source lines 31 is negative. In this case, pixels having an identical polarity are arranged in the vertical direction (Y direction). For example, when the odd-number gate lines 10 are selected in the next frame to send gate signals to the active elements, pixels having a polarity that is opposite to the polarity shown in FIG. 14 are arranged in the vertical direction to carry out vertical line inversion driving. When the vertical line is inverted for each frame, noise occurs less frequently.

In FIG. 14, the first and second source lines 31, 32, and the first gate lines 10 are electrically connected to the respective first active elements 28a, while the first and second source lines 31, 32, and the second gate lines 9 are electrically connected to the respective second active element 28b. By selecting the first gate lines 10 or the second gate lines 9, the polarity of the pixels is determined. This is because the first source lines 31 have a negative polarity and the second source lines 32 have a positive polarity.

FIG. 15 shows, for example, polarities of the pixels when a pair of gate lines 9, 10 are selected every two lines from the plurality of gate lines 10 (multiple lines) to send gate signals to the active elements. As shown, the polarity of the second source lines 32 is positive and the polarity of the first source lines 31 is negative. In this case, pixels having positive and negative polarities are alternately arranged in both the vertical and horizontal directions. When different pairs of gate lines 9, 10 are selected in the next frame to send gate signals to the active elements, pixels having a polarity that is opposite to the polarity shown in FIG. 15 are alternately arranged to carry out dot inversion driving. The inversion driving in the pixels shown in FIGS. 14 and 15 is similarly carried out in the following embodiments.

The positive voltage in the present embodiment is in the range, for example, of 0 V to +5 V, and the negative voltage is in the range of 0 V to −5 V. If the channel layers 27 are formed of an oxide semiconductor (e.g., composite oxide semiconductor of indium, gallium, zinc and zinc, which is referred to as IGZO), the breakdown voltage is high in such an oxide semiconductor, so that a high voltage can be used.

The present invention does not limit the positive voltage and the negative voltage to the voltages mentioned above. For example, the positive voltage may be in the range of 0 V to +2.5 V, and the negative voltage may be in the range of 0 V to −2.5 V. In other words, the upper limit of the positive voltage may be set to +2.5 V, and the lower limit of the negative voltage may be set to −2.5 V. These settings achieve an effect of reducing power consumption, reducing noise generation, or reducing or preventing sticking of the liquid crystal display image.

For example, use of IGZO transistors (active elements) having good memory properties as the channel layers 27 can allow omitting of the auxiliary capacitance (storage capacitor) otherwise required for constant-voltage driving when retaining common electrodes 17 at a constant voltage (constant potential). Unlike silicon semiconductor transistors, transistors using IGZO as the channel layers 27 have only a small leakage current. Therefore, for example, a transfer circuit including a latch part as described in Patent Literature 4, a related art literature, can be omitted and thus a simplified line structure can be provided. In addition, the liquid crystal display device LCD1 uses the array substrate 200 having transistors in each of which an oxide semiconductor such as IGZO is used as a channel layer. In such a device, the leakage current of the transistors is so small that the liquid crystal driving voltage can be retained after being applied to the pixel electrodes 20, enabling the liquid crystal layer 300 to retain transmittance.

When an oxide semiconductor such as IGZO is used as the channel layers 27, electrons are highly mobile in the active elements 28, so that a driving voltage corresponding to the required video signals can be applied to the pixel electrodes 20 in a short time, such as 2 milliseconds (ms) or less. For example, a single frame in double-speed driving (when displaying 120 frames per second) lasts approximately 8.3 msec. In this case, for example, 6 msec can be assigned to touch sensing.

When the common electrodes 17 having transparent electrode patterns are at a constant potential, liquid crystal driving and touch-electrode driving do not have to be time-shared. Driving frequencies may be different between when liquid crystals are driven and when touch metal wirings are driven. For example, in the active elements 28 (including the first and second active elements 28a, 28b) each using an oxide semiconductor such as IGZO as the channel layer 27, there is no need to refresh an image (rewriting with image signals) to retain transmittance, unlike with transistors each using a polysilicon semiconductor that requires the transmittance (or voltage) to be retained after application of a liquid crystal driving voltage to the pixel electrodes 20. Hence, the liquid crystal display device LCD1 that uses an oxide semiconductor such as IGZO can be driven with low power consumption.

Having high dielectric strength, an oxide semiconductor such as IGZO can drive liquid crystals at high speed and higher voltage, and can be used for displaying a three-dimensional image. Having good memory properties, the active elements 28 using an oxide semiconductor such as IGZO as the channel layers 27 have an advantage that display flicker hardly occurs even at a low liquid crystal driving frequency in the range, for example, of 0.1 Hz or more to 30 Hz or less. By carrying out both dot inversion driving at a low frequency and touch driving at a frequency different from the frequency for the dot inversion driving by use of the active elements 28 having IGZO channel layers, both high-quality image display and highly precise touch sensing can be achieved with low power consumption.

In addition, the active elements 28 in which the oxide semiconductor is used as the channel layers 27 boast low leakage current as described above, and hence can hold the driving voltage applied to the pixel electrodes 20 for a long time. In addition to forming the source lines 31, 32, gate lines 9, 10 (auxiliary capacitance lines) of the active elements 28 with copper lines having lower line-resistance than aluminum lines, use of IGZO, which can be driven in a short time, as the active elements, can provide enough time for touch-sensing scan. In other words, use of an oxide semiconductor such as IGZO for the active elements can shorten the period of time required to drive liquid crystals and the like, and can provide a sufficient temporal margin for touch sensing during video signal processing of the whole display screen. This makes it possible to accurately detect a change in the generated capacitance.

In addition, use of an oxide semiconductor, such as IGZO, as the channel layers 27 can substantially eliminate the influence of the coupling noise on dot inversion driving and column inversion driving. This is because the active elements 28 that use the oxide semiconductor can apply the voltage corresponding to the video signals to the pixel electrodes 20 in a very short time (e.g., 2 msec), and boast superior memory properties for holding the pixel voltage after the application of the video signals, thereby causing no noise during the period when the pixel voltage is held by virtue of their memory properties, and reducing the influence on touch sensing.

Materials that can be used for the oxide semiconductor include oxide semiconductors containing two or more metal oxides of indium, gallium, zinc, tin, aluminum, germanium and cerium.

(Liquid Crystal Driving)

Figure 16:
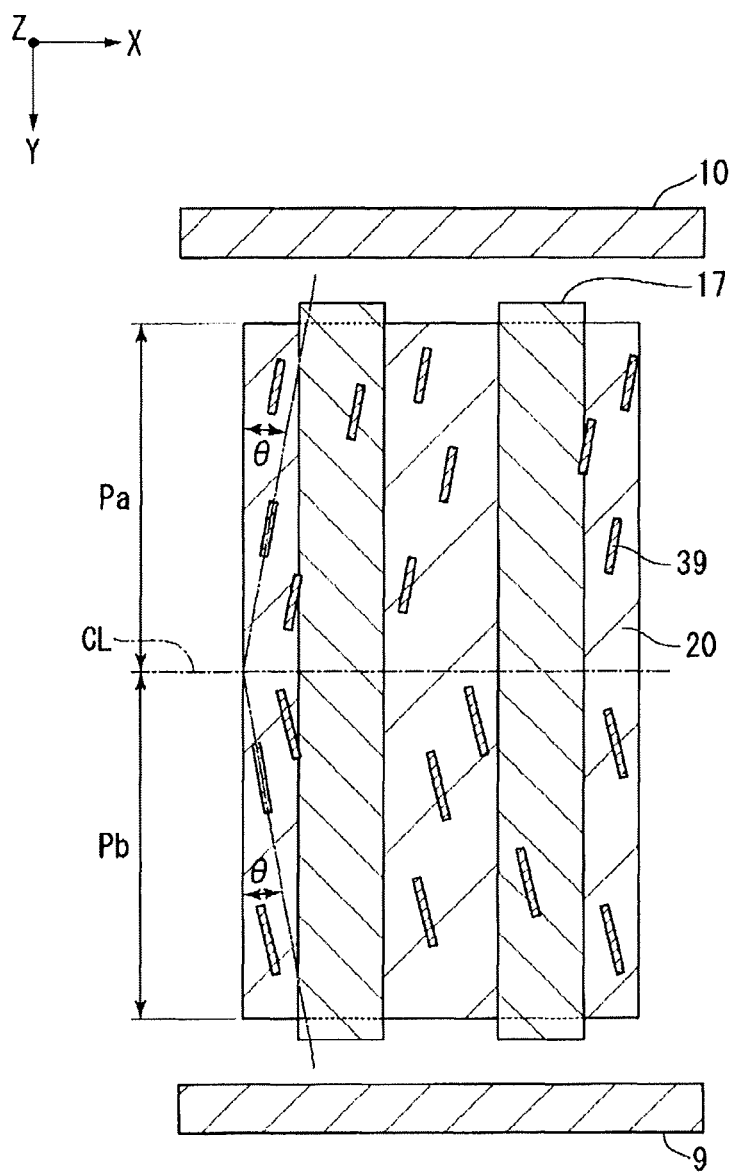
FIG. 16 is a partial plan view illustrating a pixel of a liquid crystal display device according to the first embodiment of the present invention, that is, illustrating how liquid crystals are aligned in a pixel.
Figure 17:
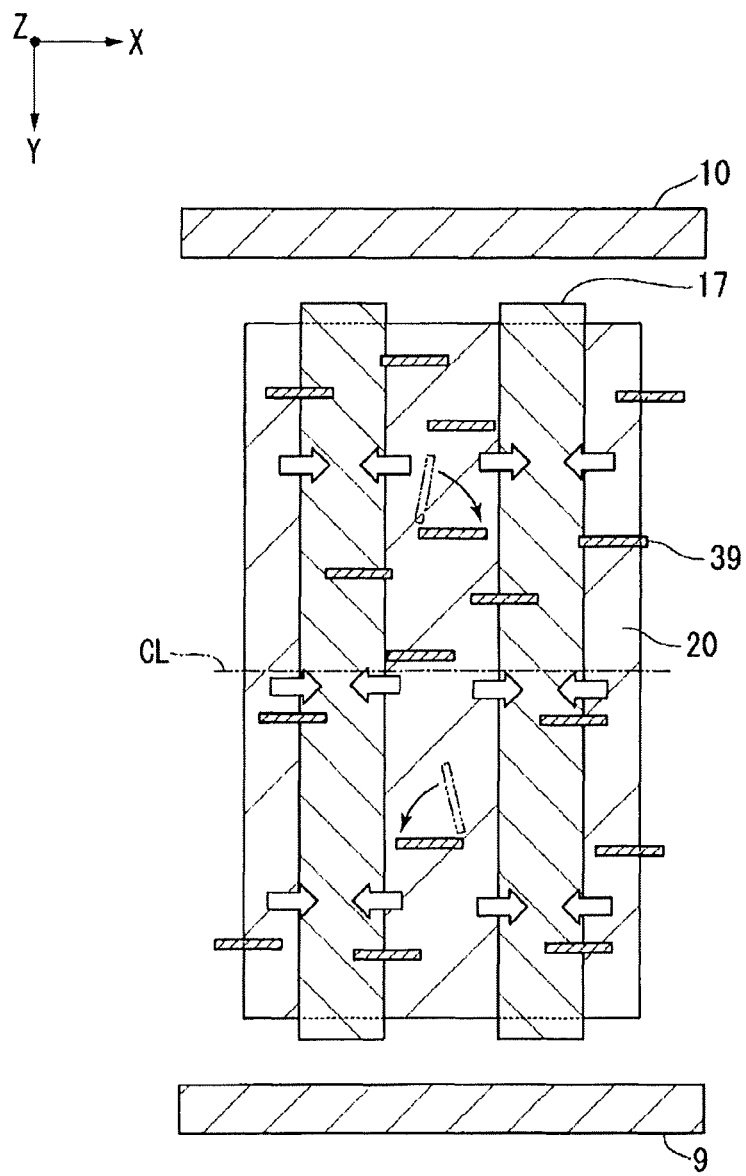
FIG. 17 is a partial plan view illustrating a pixel of a liquid crystal display device according to the first embodiment of the present invention, that is, illustrating how liquid crystals are driven when a liquid crystal driving voltage is applied across a pixel electrode and a common electrode.

FIGS. 16 and 17 are partial plan views illustrating a pixel of the liquid crystal display device LCD1 according to the first embodiment of the present invention. These figures show liquid crystal alignment in a single pixel to clarify how liquid crystal molecules 39 are aligned. FIG. 16 is a partial plan view illustrating a pixel of the liquid crystal display device LCD1, that is, illustrating how liquid crystals are aligned in one pixel (initial alignment). FIG. 17 is a partial plan view illustrating a pixel of the liquid crystal display device LCD1, that is, illustrating how liquid crystals are driven when a liquid crystal driving voltage is applied across the pixel electrode 20 and the common electrodes 17.

In the examples shown in FIGS. 16 and 17, the pixel electrode 20 is formed in a rectangular shape, and the longitudinal direction of the pixel electrode 20 corresponds to the Y direction. Alignment treatment is applied to the film so that the liquid crystal molecules 39 of the liquid crystal layer 300 are inclined at an angle θ relative to the direction in which the rectangular pixel electrode 20 extends (Y direction).

Particularly in the present embodiment, each pixel is defined into two areas, that is, each pixel has an upper area Pa (first area) and a lower area Pb (second area). The upper and lower areas Pa, Pb are line symmetrically arranged relative to a pixel center CL (center line parallel to the X direction). The upper and lower areas Pa, Pb give a pre-tilt of the angle θ to the liquid crystal molecules 39 of the liquid crystal layer 300 in the Y direction. In the upper area Pa, the liquid crystal molecules 39 are pre-tilted clockwise at the angle θ relative to the Y direction. In the lower area Pb, the liquid crystal molecules 39 are pre-tilted counterclockwise at the angle θ relative to the Y direction. Alignment treatment can be applied to the film by optical alignment or rubbing. The angle θ is not required to be specifically defined but may be in the range, for example, of 3° to 15°.

With the liquid crystal molecules 39 being initially aligned in this way, application of a voltage across the pixel electrode 20 and the common electrodes 17 generates fringe electric fields therebetween as shown in FIG. 17. The fringe electric fields cause the liquid crystal molecules 39 to be aligned and driven along the direction of the fringe electric fields. More specifically, as shown in FIG. 27, the fringe electric fields occur in a direction from the pixel electrode 20 to the common electrodes 17 to drive the liquid crystal molecules 39 along the fringe electric fields and rotate them in plan view.

Figure 27:
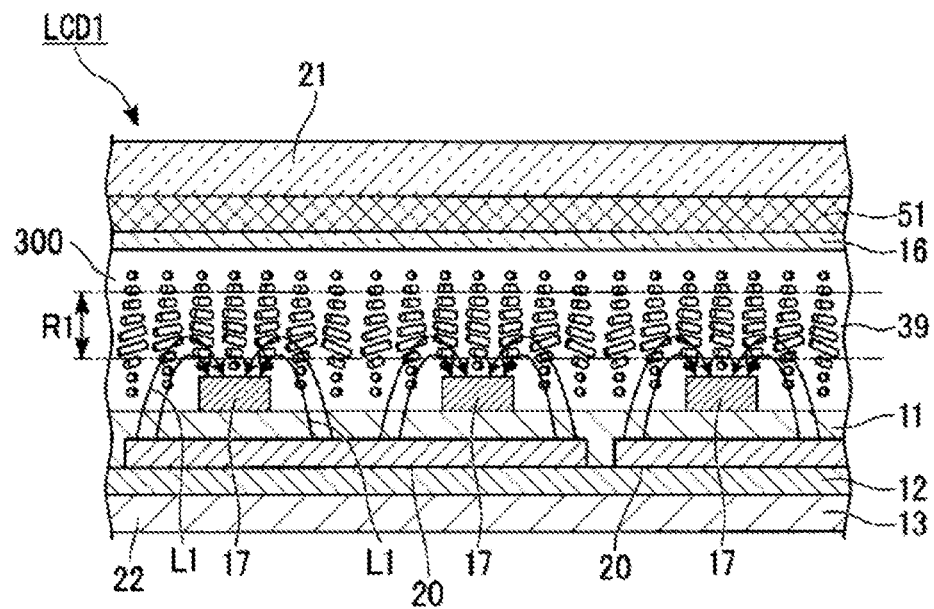
FIG. 27 is a partial cross-sectional view illustrating a liquid crystal display device using FFS mode liquid crystal, that is, illustrating how liquid crystals are driven by fringe electric fields when a liquid crystal driving voltage is applied across pixel electrodes and common electrodes.

FIG. 27 is a partial cross-sectional view illustrating the liquid crystal display device LCD1, that is, illustrating how liquid crystal driving operates when a liquid crystal driving voltage is applied across the common electrodes 17 and the pixel electrode 20. A liquid crystal driving method called FFS drives the liquid crystal molecules 39 using the electric field occurring between the common electrodes 17 and the pixel electrode 20, the electric field in particular occurring at an end of the electrode being called a fringe. As shown in FIG. 27, the liquid crystal molecules 39 in a part R1 of the liquid crystal layer 300 in the thickness direction rotate and are the main contribution to changing transmittance. Therefore, a liquid crystal display device driven by a longitudinal electric field, such as a VA liquid crystal display device, which can fully utilize liquid crystal molecules in the thickness direction of the liquid crystal layer 300, provides higher transmittance in the vertical direction as viewed from an observer than a liquid crystal display device driven by a transverse electric field, such as an FFS liquid crystal display device. The liquid crystal display device LCD1 according to the present embodiment, however, uses a transverse electric field driving mode because a liquid crystal display device driven by a transverse electric field, such as an FFS liquid crystal display device, has a characteristic of having a wider viewing angle.

The liquid crystal display device LCD1 of the present embodiment will be described with reference to related art, for more specific description of the fringe electric fields that occur in the liquid crystal display device LCD1.

Figure 28:
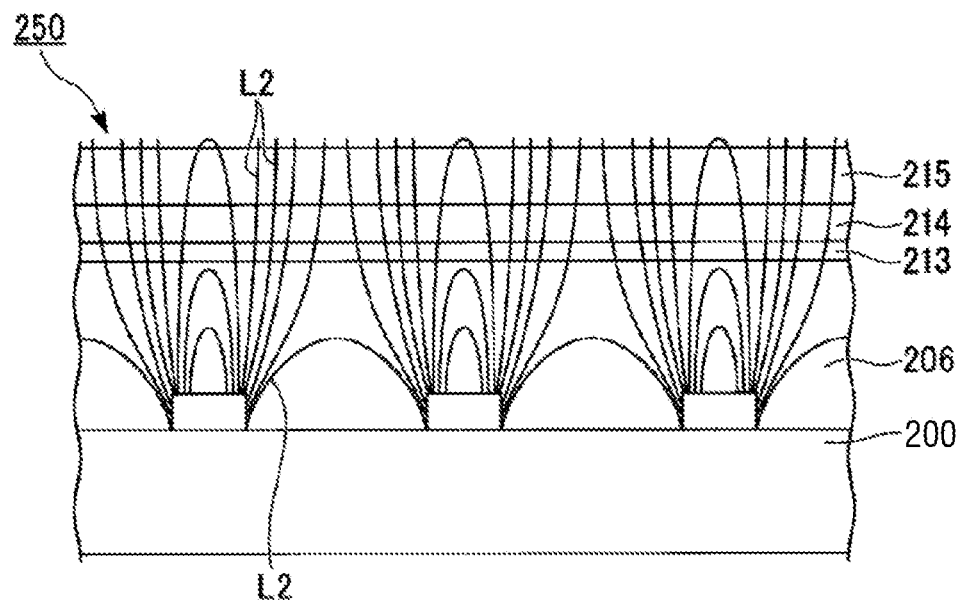
FIG. 28 is a schematic cross-sectional view illustrating a display unit together with equipotential lines, according to a conventional liquid crystal display device.

FIG. 28 is a cross-sectional view of a conventional liquid crystal display device 250, that is, a schematic view of equipotential lines L2 at the time of application of a liquid crystal driving voltage. In the absence of transparent electrodes or a conductive film from a transparent substrate 215, the equipotential lines L2 penetrate through a transparent resin layer 213, a color filter 214, and a transparent substrate 215 and extend upward. By extending the equipotential lines L2 in the thickness direction of a liquid crystal layer 206, effective thickness is ensured to some extent in the liquid crystal layer 206, which leads to ensuring the inherent transmittance of the liquid crystal display device 250 of the transverse electric field driving mode.

Figure 29:
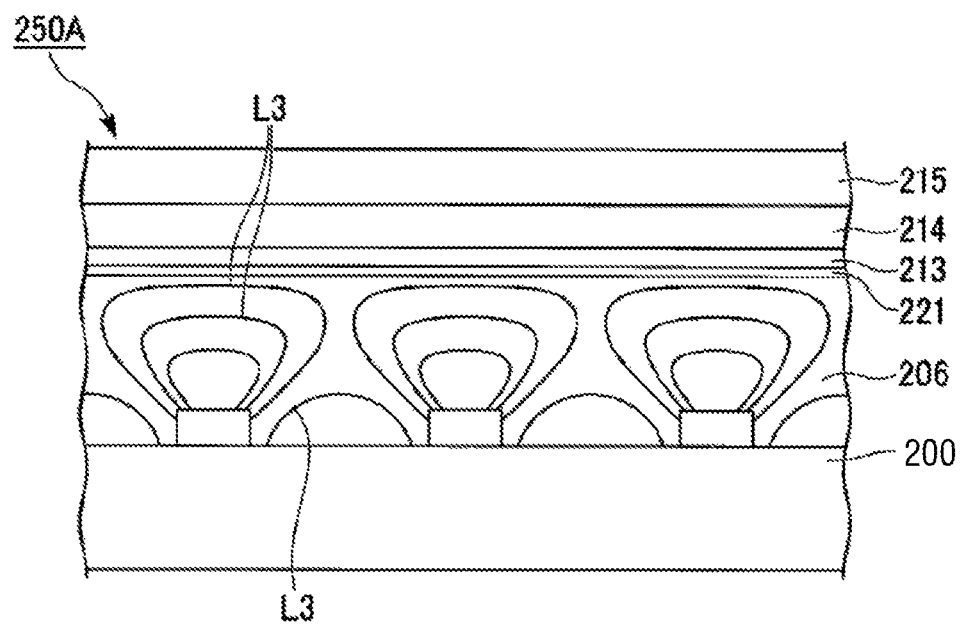
FIG. 29 is a schematic cross-sectional view illustrating a display unit together with equipotential lines, according to a modification of a conventional liquid crystal display device.

FIG. 29 is a cross-sectional view of a conventional liquid crystal display device 250A in which a counter electrode 221 is additionally provided between the liquid crystal layer 206 and the transparent resin layer 213, besides the components of the conventional liquid crystal display device 250 described above. In this case, since equipotential lines L3 do not penetrate through the counter electrode 221, the equipotential lines L3 are deformed as compared to the equipotential lines L2 described above. Also, the effective thickness of the liquid crystal layer 206 becomes smaller than that of the liquid crystal layer 206 of the liquid crystal display device 250, resulting in significant decrease in luminance (transmittance) of the liquid crystal display device 250A.

The liquid crystal display device LCD1 according to the present embodiment is different from such conventional liquid crystal display devices shown in FIGS. 28 and 29. In the display device substrate 100, the touch sensing lines 3 are provided only to narrow areas on the black matrix BM, while conductors, such as electrodes, are not present in the pixel apertures. Therefore, as in FIG. 28, the display device substrate 100 can generate electric fields, as shown by the equipotential lines, extending evenly from the array substrate 200 toward the outside of the display device substrate 100 to ensure sufficient transmittance. In the liquid crystal display device LCD1 of the present embodiment, the common electrodes 17 are formed above the pixel electrodes 20, and the potential of the common electrodes 17 is maintained at 0 V. In this configuration, application of a voltage across the pixel electrodes 20 and the common electrodes 17 creates fringe electric fields from the pixel electrodes 20 toward the common electrodes 17. These fringe electric fields drive the liquid crystal molecules 39. These fringe electric fields drive the liquid crystal molecules 39.

(Touch Sensing Driving)

Figure 18:
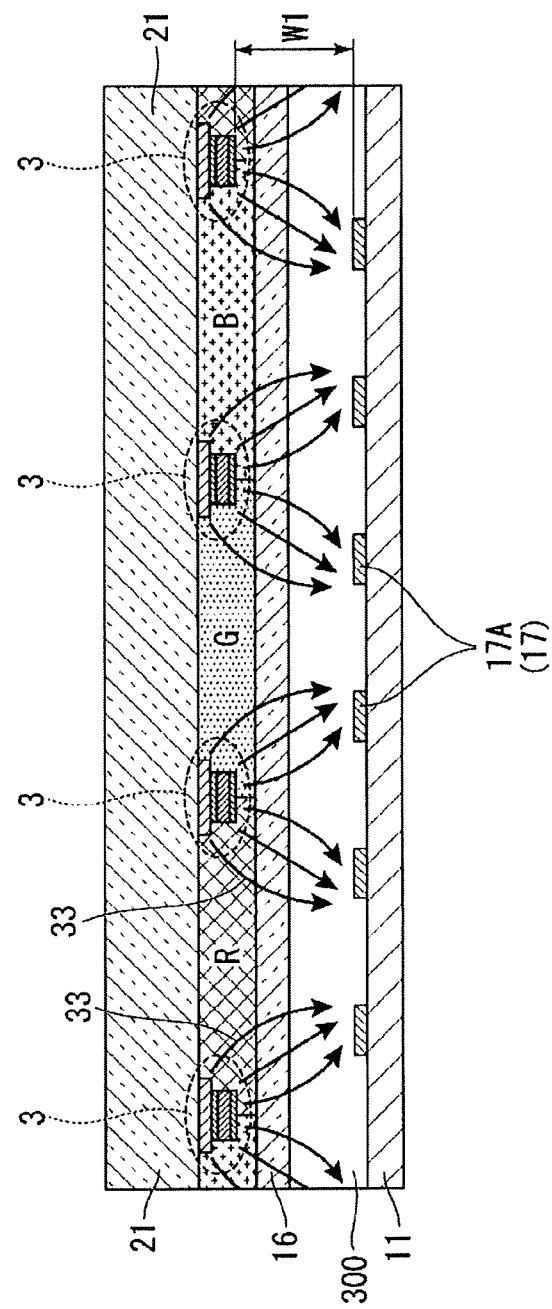
FIG. 18 is a schematic cross-sectional view illustrating a state where an electric field is created between touch sensing lines and common electrodes where the touch sensing lines act as touch driving electrodes and the common electrodes act as touch detection electrodes, in a liquid crystal display device according to the first embodiment of the present invention.
Figure 19:
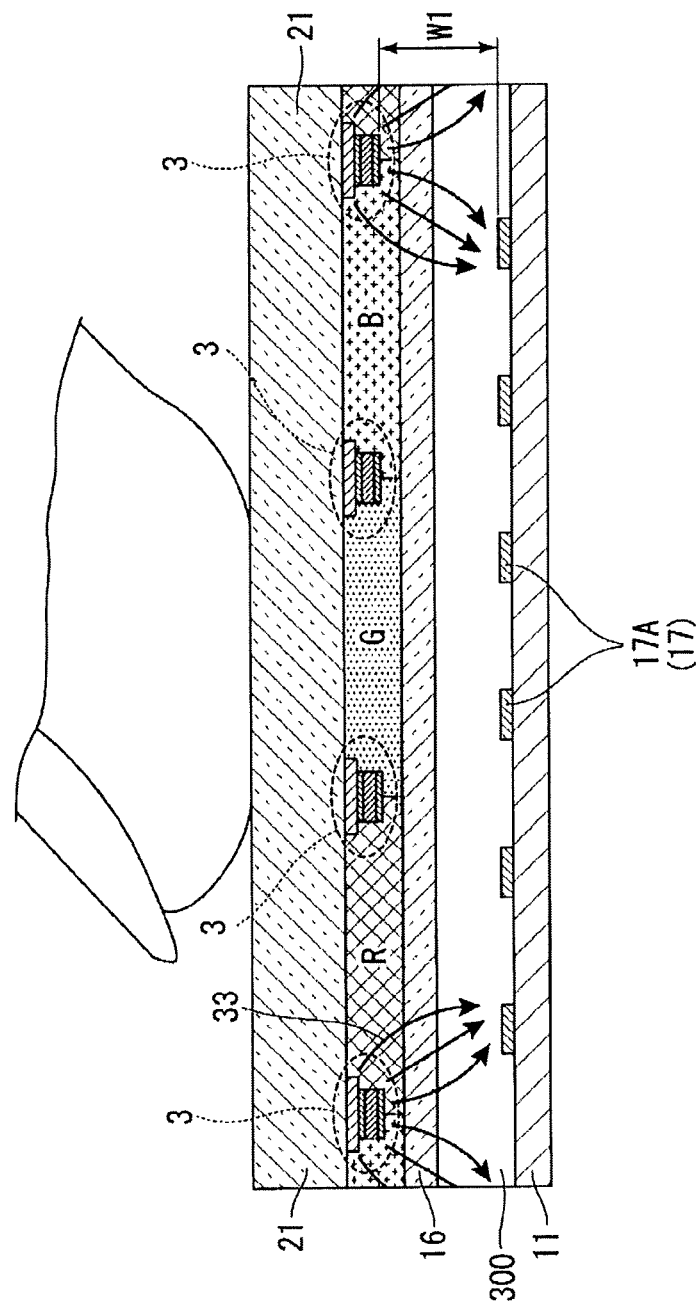
FIG. 19 is a schematic cross-sectional view illustrating a liquid crystal display device according to the first embodiment of the present invention, that is, illustrating a change in electric fields created when a finger or other pointer contacts or comes close to the observer side surface of the display device substrate.

FIGS. 18 and 19 show a structure in which the touch sensing lines 3 act as touch driving electrodes and the common electrodes 17 act as touch detection electrodes in the liquid crystal display device LCD1 according to the first embodiment of the present invention. FIG. 18 is a schematic cross-sectional view illustrating a state where electric fields have been created between touch sensing lines and common electrodes. FIG. 19 is a cross-sectional view illustrating how the created electric fields change when a finger or other pointer contacts or comes close to the observer side surface of the display device substrate 100.

FIGS. 18 and 19 illustrate a touch sensing technique using the touch sensing lines 3 and the common electrodes 17. To clarify touch sensing driving, FIGS. 18 and 19 show the first insulating layer 11 and the common electrodes 17, which constitute the array substrate 200, and the display device substrate 100, while omitting the rest of the configuration.

Figure 21:
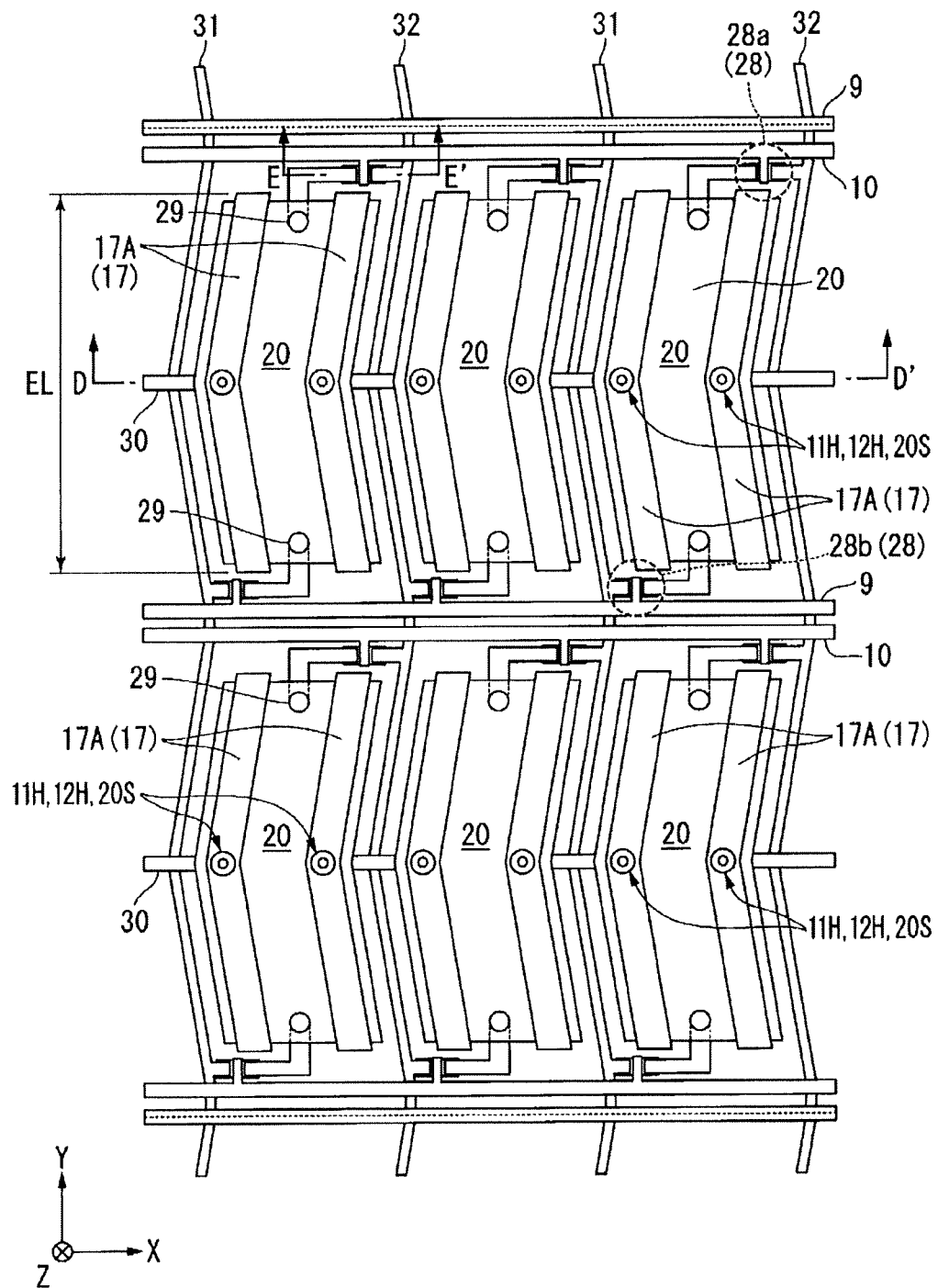
FIG. 21 is a partial plan view illustrating an array substrate constituting a liquid crystal display device according to a second embodiment of the present invention, as viewed from an observer.

As shown in FIGS. 18 and 19, the touch sensing lines 3 diagonally face the common electrodes 17 in the thickness direction of the liquid crystal layer 300. This makes it possible to easily impart contrast to the change in the state of creating oblique electric fields, which exerts an effect of enhancing (improving) the S/N ratio of touch sensing. For example, in a structure in which the touch detection electrodes and the touch driving electrodes respectively overlap each other in the thickness direction, capacitance hardly changes in parts where these electrodes overlap, and thus, contrast is unlikely to be imparted to the S/N ratio of touch sensing. For example, if the touch detection electrodes are parallel to and flush with the touch driving electrodes, capacitance is apt to change unevenly depending on the position of the finger or other pointer, easily resulting in erroneous detection. As shown in FIGS. 2 and 21, the common electrodes 17 act as detection electrodes and each have the length EL, in the liquid crystal display device LCD1 according to the embodiments of the present invention. The common electrodes 17 having the length EL are parallel to the touch sensing lines 3 acting as drive electrodes in plan view. Such common electrodes 17 are capable of sufficiently and easily providing capacitance.

FIG. 18 schematically illustrates how capacitance occurs when the touch sensing lines 3 act as touch driving electrodes, and the common electrodes 17 act as touch detection electrodes. The touch sensing lines 3 are respectively supplied with pulsed write signals at a predetermined frequency. The write signals may be supplied in a time-sharing manner in terms of liquid crystal driving and touch driving. The write signals maintain the capacitance, which is indicated by electric force lines 33 (arrows), between the grounded common electrodes 17 and the touch sensing lines 3.

As shown in FIG. 19, the capacitance between the common electrodes 17 and the touch sensing lines 3 changes as a finger or other pointer contacts or comes close to the surface of the display device substrate 100 on the observer side. The change in capacitance enables detection as to whether the finger or other pointer has touched the surface.

As shown in FIGS. 18 and 19, neither electrodes nor lines associated with liquid crystal driving are provided between the touch sensing lines 3 and the common electrodes 17. In addition, as shown in FIGS. 3 and 5, the first and second source lines 31, 32 are provided away from the touch sensing lines 3 and the common electrodes 17 (the touch driving lines and the touch detection lines). This achieves a structure that is unlikely to pick up the noise associated with liquid crystal driving.

For example, in plan view, the plurality of touch sensing lines 3 extend in the first direction (e.g., Y direction), while being arranged in the second direction (e.g., X direction). The plurality of common lines 30 (conductive lines) are located below the pixel electrodes 20 in the array substrate 200 in the Z direction and extend in the second direction (e.g., X direction), while being arranged in the first direction (e.g., Y direction). The common electrodes 17 are electrically connected to the corresponding common line 30, and the change in capacitance between the common electrodes 17 and the touch sensing lines 3 is used for touch detection.

In the liquid crystal display device LCD1 according to the present embodiment, AC pulse signals are applied between the touch sensing lines 3 and the common electrodes 17 at a frequency in the range, for example, of 500 Hz or more to 100 kHz or less. Normally, the common electrodes 17 serving as detection electrodes maintain a constant output waveform by the application of the AC pulse signals. When a finger or other pointer contacts or comes close to the observer side surface of the display device substrate 100, the output waveform of the common electrodes 17 changes and the change is used for determining whether the surface has been touched. The distance from the finger or other pointer to the display surface can be measured by the time taken from the point of approach of the pointer to the point of touch (usually from several hundred microseconds to several milliseconds), the number of output pulses counted within the time period, and the like. By taking an integral value of the touch detection signals, touch detection can be stably conducted.

There is no need to use all of the touch sensing lines 3 and the common lines 30 (or the common electrodes connected to the conductive lines) for touch sensing. Thinning driving may be conducted. The thinning driving of the touch sensing lines 3 will be described. First, the touch sensing lines 3 are all divided into a plurality of groups. The number of groups should be fewer than the total number of touch sensing lines 3. Let us assume that one group consists of six lines. For example, two are selected from the six lines (i.e., the selected number is smaller than the total number of lines; 2<6). In each group, the selected two lines are used for touch sensing, and the potentials of the remaining four lines are set to a floating potential. Since the liquid crystal display device LCD1 has a plurality of groups, touch sensing can be conducted on a group basis, with the functions of the lines being defined as mentioned above in each group. Similarly, the common lines 30 may also be thinned out before being driven.

By carrying out touch sensing driving for each group in this way, the number of lines used for scanning or detection is reduced, enabling quicker touch sensing. In the above example, six lines form one group. Instead, for example, ten or more lines may form one group, and touch sensing may be conducted using two lines selected in a group. In other words, the number of lines to be thinned out (the number of lines provided with the floating potential) may be increased to reduce the density of the selected lines for use in touch sensing (reduce the ratio of the number of selected lines to the total number of lines) to thereby carry out scanning or detection using the selected lines. This contributes to reducing power consumption or improving touch detection accuracy. On the other hand, the number of lines to be thinned out may be reduced to raise the density of the selected lines for use in touch sensing to thereby carry out scanning or detection using the selected lines. This can be applied, for example, to fingerprint authentication or stylus input.

Touch sensing driving and liquid crystal driving may be carried out in a time-sharing manner. The touch driving frequency may be adjusted according to the required touch input speed. The touch driving frequency may be higher than the liquid crystal driving frequency. The touch driving frequency is desirably high because of the irregularity of timing and the short time duration of touch or approach of the finger or other pointer to the observer side surface of the display device substrate 100.

There are several methods for differentiating between the touch driving frequency and the liquid crystal driving frequency. For example, in normally-off liquid crystal driving, a backlight may also be turned off in a black mode (off state), during which (during a period when liquid crystal display is not affected) touch sensing may be carried out. In this case, various touch driving frequencies can be selected.

In addition, a touch driving frequency different from the liquid crystal driving frequency is easily selected even when liquid crystal having negative dielectric anisotropy is used. In other words, as shown in FIGS. 18 and 19, the electric force lines 33 occurring from the touch sensing lines 3 toward the common electrodes 17 act in the diagonal direction or the thickness direction of the liquid crystal layer 300. In this regard, use of liquid crystal having negative dielectric anisotropy can prevent liquid crystal molecules from rising in the direction of the electric force lines 33 and accordingly they are less likely to adversely affect display quality.

In addition, a touch driving frequency different from the liquid crystal driving frequency can be easily set in the case of lowering the resistance of the touch sensing lines 3 or the common lines 30 to lower the touch driving voltage according to the lowering of the resistance. Use of a highly conductive metal, such as copper or silver, in a metal layer forming the touch sensing lines 3 or the common lines 30 can provide low line resistance.

A 3D (stereoscopic image) display device requires a plurality of video signals (e.g., a video signal for the right eye and a video signal for the left eye) to three-dimensionally display images at shallower and deeper positions, in addition to normal two-dimensional images. Therefore, high-speed driving, for example, at 240 Hz or 480 Hz, and many video signals, are needed in association with the frequency of liquid crystal driving. In this case, great benefit is obtained from differentiating the touch driving frequency from the liquid crystal driving frequency. For example, the present embodiment enables high-speed and highly accurate touch sensing in a 3D display game console. The present embodiment is particularly useful in a device with a display screen that frequently receives finger or other touch inputs, such as a game console or an automatic cash dispenser.

As typically seen in video display, a rewrite operation is frequently carried out by pixel video signals. The source lines 31, 32 are preferably distanced from the touch sensing lines 3 in the thickness direction (Z direction) of the source lines 3 as in the embodiments of the present invention because the noise associated with these video signals is derived from the source lines. According to the embodiments of the present invention, touch driving signals are applied to the touch sensing lines 3 located far from the source lines 31, 32, and therefore the noise has less influence than in the structure disclosed in Patent Literature 6, in which the lines applied with touch driving signals are provided on an array substrate.

In general, a liquid crystal driving frequency is 60 Hz or an integral multiple thereof. Normally, touch sensing parts are affected by noise associated with liquid crystal driving frequency. Further, the touch sensing parts are apt to pick up noise arising from an electric device driven by an external power source such as an ordinary household power source, which is an AC power source of 50 Hz or 60 Hz. Therefore, use of a frequency different from 50 Hz or 60 Hz frequency or a frequency slightly shifted from an integral multiple thereof as the touch driving frequency, can significantly reduce the influence of the noise arising from the liquid crystal driving or from an external electronic device. Alternatively, the touch sensing driving signals may be applied at a time point shifted, along a time axis, from the time point of applying the liquid crystal driving signals. The shifting may only be slight, for example, in the range of ±3% to ±17% from the noise frequency. This shifting can reduce interference with the noise frequency. For example, a different touch driving frequency that does not interfere with the liquid crystal driving frequency or power supply frequency mentioned above can be selected from the range of several kilohertz to several hundred kilohertz. By selecting a frequency that does not interfere with the liquid crystal driving frequency or the power supply frequency as the touch driving frequency, the influence of noise, such as the coupling noise associated with dot inversion driving, can be alleviated.

In touch sensing driving, a touch position may be detected by the thinning driving as described above, rather than by supplying a driving voltage to all the touch sensing lines 3 to thereby reduce power consumption at the time of touch sensing.

At the time of the thinning driving, the lines that are not used for touch sensing, i.e., the lines having a floating pattern may be switched to detection electrodes or drive electrodes by a switching element to achieve high-definition touch sensing. Alternatively, the lines having a floating pattern can be switched so as to be electrically connected to the ground (so as to be grounded to the casing). The signal lines of the TFTs and other active elements may be temporarily grounded (to the chassis, etc.) at the time of touch sensing signal detection, for a better touch sensing S/N ratio.

For touch sensing lines that take a long time to reset capacitance detected by touch sensing control, i.e., touch sensing lines having a large time constant (product of capacitance and resistance) in touch sensing, for example, touch sensing lines of odd-number rows and those of even-number rows may be alternately driven, with the time constant being adjusted. A plurality of touch sensing lines may be grouped for driving and detection. The plurality of touch sensing lines do not have to be grouped line-sequentially, but collective detection may be conducted on a group basis, which is referred to as a self-detection process. Parallel driving may also be carried out on a group basis. Alternatively, a difference detection process may be used, which detects a difference between the detection signals of touch sensing lines that are close or adjacent to each other to thereby cancel noise such as of parasitic capacitance.

The first embodiment described above can provide a liquid crystal display device LCD1 that is responsive to a high-definition and high-speed touch input. The embodiment can also achieve a liquid crystal display device that boasts low power consumption and low flicker, and has a touch sensing function. Further, the embodiment does not need to invert the potential of the common electrodes 17 (common lines 30) and can maintain the potential of the common electrodes 17 at a constant potential such as 0 V. According to the first embodiment, voltage polarities of the source lines 31, 32 are not inverted from positive to negative, or vice versa. In addition, the voltage polarity of the common electrodes 17 is not inverted either. As a result, the noise associated with the touch sensing driving can be significantly reduced. In addition, the amplitude of the potential supplied to the source lines (width of the maximum voltage) is only half the amplitude of conventional liquid crystal display devices that carry out positive/negative inversion. This eliminates the need of using drivers of high breakdown voltage, and reduces the cost incurred in the drivers. Further, a liquid crystal display device that enables stable electrical implementation between the array substrate 200 and the display device substrate 100 can be provided.

(Modification of the First Embodiment)

Figure 20:
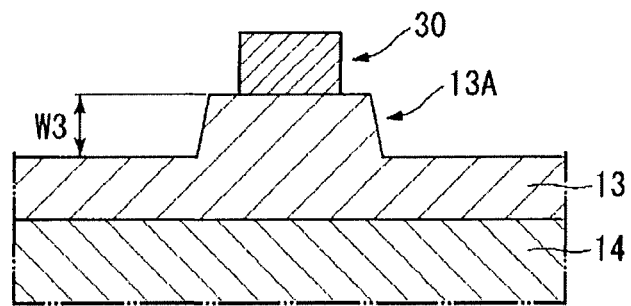
FIG. 20 is a partial plan view illustrating a main part of an array substrate constituting a liquid crystal display device according to a modification of the first embodiment of the present invention.

FIG. 20 is an enlarged cross-sectional view of a main part of a liquid crystal display device according to a modification of the first embodiment of the present invention. In FIG. 20, components identical to those of the embodiment described above are given the same reference signs to omit or simplify description.

FIG. 20 illustrates a third insulating layer 13 formed on the array substrate 200, a protrusion 13A formed on the third insulating layer 13, and a common line 30 formed on the protrusion 13A, and omits other insulating layers, lines, electrodes and the like. The protrusion 13A is formed of, for example, an insulating material that forms the insulating layer described above.

In plan view, the patterns of the protrusion 13A and the common line 30 are aligned. The protrusion 13A has an upper surface at a height W3 from the upper surface of the third insulating layer 13, where the protrusion 13A is not formed. An exemplary method of forming the protrusion 13A includes forming the third insulating layer 13 on the fourth insulating layer 14 according to the embodiments described above, followed by additionally providing the protrusion 13A on the third insulating layer 13. Such a method of forming the protrusion 13A uses a known film formation process or patterning process. The third insulating layer 13 and the protrusion 13A may be made of the same or different material.

Specifically, the height W3 of the protrusion 13A can be set appropriately from the viewpoint of reducing or preventing intrusion of noise into the common line 30 caused by the video signal supplied to the first and second source lines 31, 32.

In addition, as shown in FIG. 5, the third insulating layer 13 is required to be appropriately thick in consideration of switching characteristics of the active elements 28 because the third insulating layer 13 acts as a gate insulating film located between the gate electrode 25 and the channel layer 27. In consideration of reducing or preventing the intrusion of noise into the common line 30 caused by the video signal supplied to the source line and achieving desired switching characteristics in the active elements 28, the thickness of the third insulating layer 13 is required to be partially differentiated on the fourth insulating layer 14.

In this regard, the third insulating layer 13 is first formed on the fourth insulating layer 14 with an appropriate thickness in consideration of the switching characteristics of the active elements 28, and then the protrusion 13A having the height W3 in consideration of the noise influence on the common line 30 is formed on the third insulating layer 13. Then, the common line 30 is formed on the protrusion 13A. This configuration can keep the insulator thickness between the common line 30 and the first source line 31, and the insulator thickness between the common line 30 and the second source line 32 large (sum of the thicknesses of the third insulating layer 13 and the protrusion 13A). With these thicknesses being kept large, the third insulating layer 13 located directly above the channel layer 27 can have a reduced thickness. Thus, the intrusion of noise into the common line 30 caused by the video signal supplied to the source line is reduced or prevented, and desired switching characteristics are achieved in the active elements 28.

(Second Embodiment)

Referring to FIGS. 21 to 26, a liquid crystal display device LCD2 according to a second embodiment will be described. Components identical to those of the embodiment described above are given the same reference signs to omit or simplify description.

FIG. 21 is a partial plan view illustrating an array substrate 200 constituting the liquid crystal display device LCD2 according to the second embodiment of the present invention, as viewed from an observer.

Figure 22:
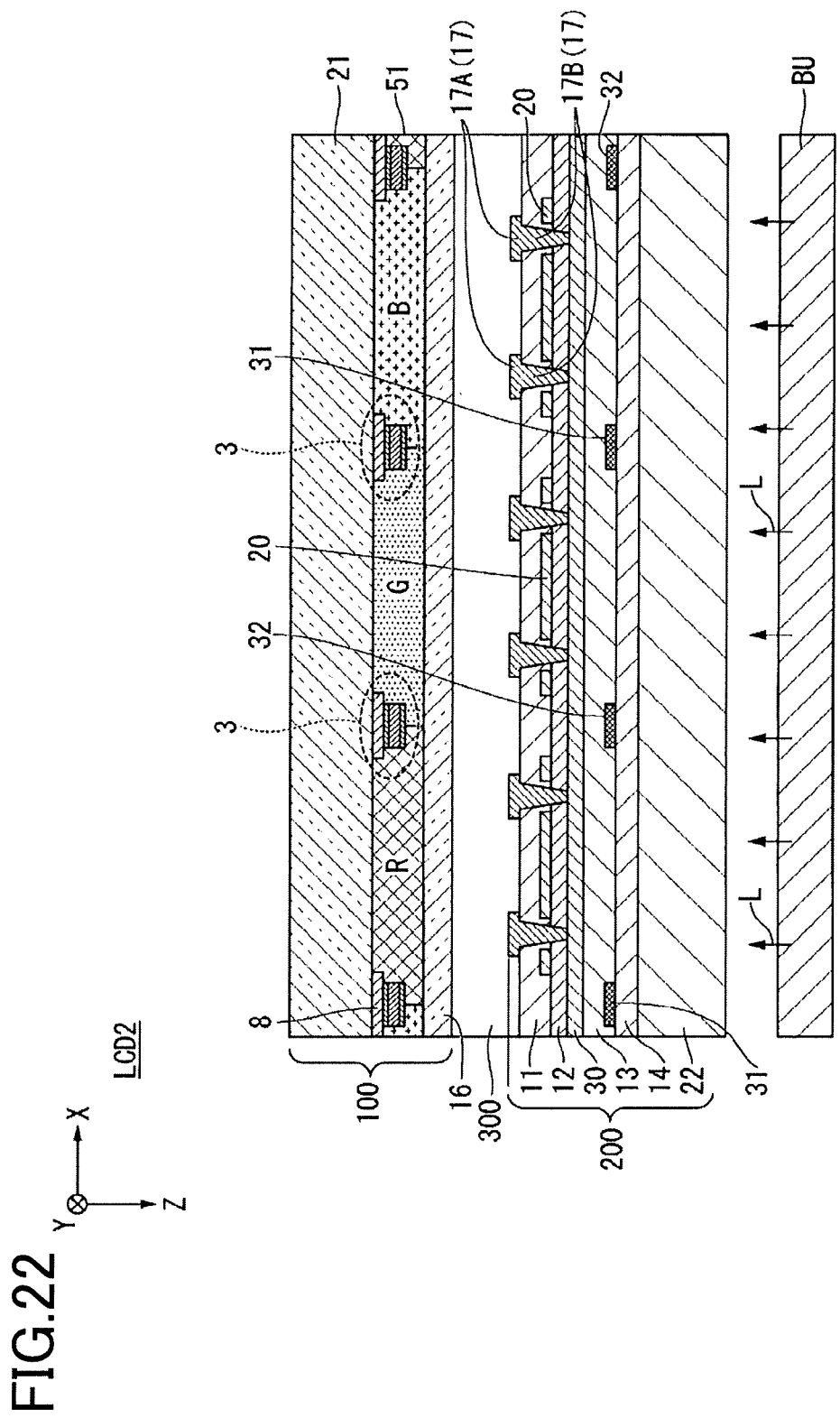
FIG. 22 is a partial cross-sectional view taken along the line D-D' of FIG. 21, illustrating the array substrate constituting the liquid crystal display device according to the second embodiment of the present invention.

FIG. 22 is a partial cross-sectional view taken along the line D-D' of FIG. 21, illustrating the array substrate 200 constituting the liquid crystal display device LCD2 according to the second embodiment of the present invention.

Figure 23:
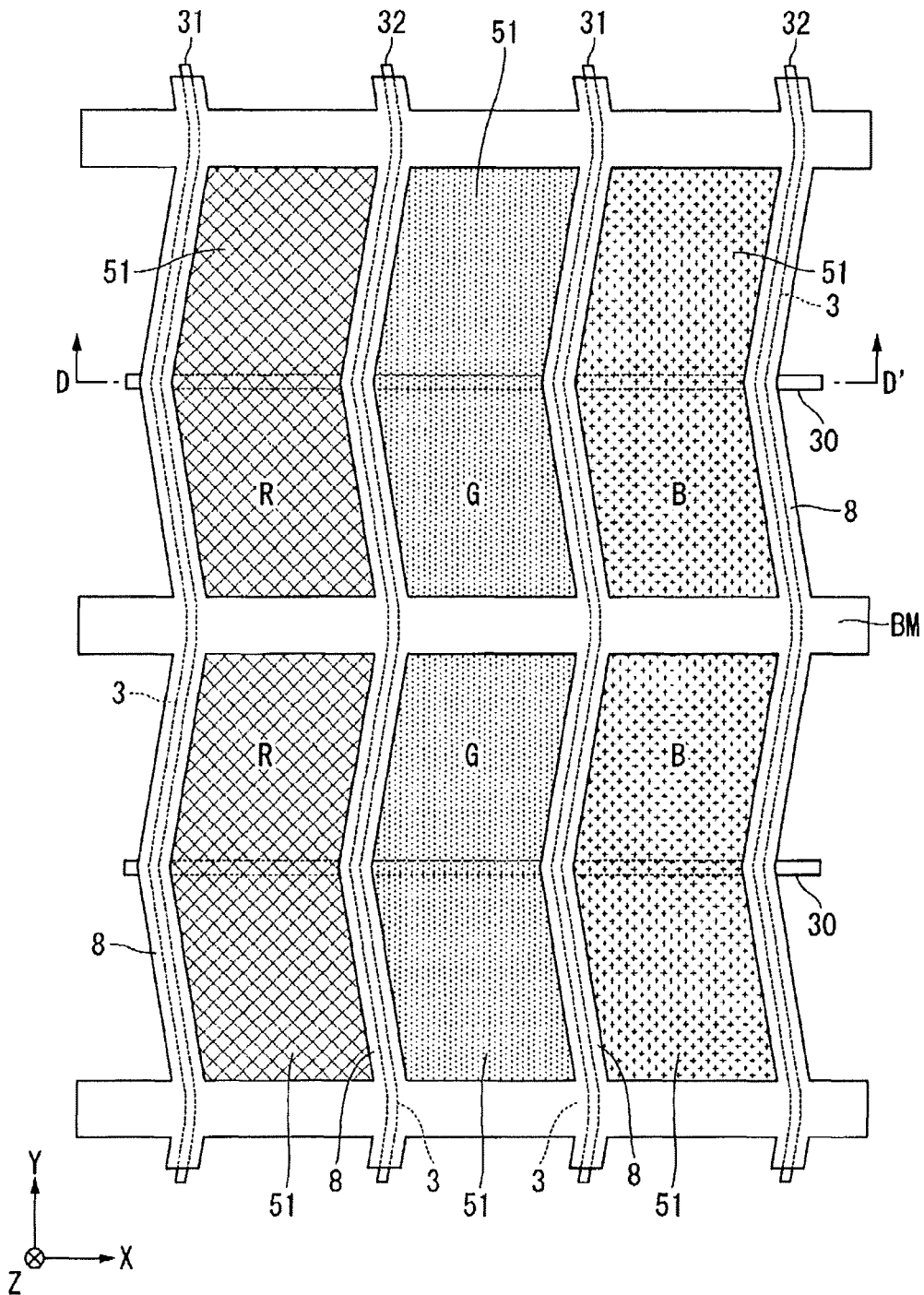
FIG. 23 is a partial plan view illustrating a liquid crystal display device according to the second embodiment of the present invention, that is, illustrating a structure in which a display device substrate having color filters and touch sensing lines is laminated on an array substrate via a liquid crystal layer, as viewed from an observer.

FIG. 23 is a partial plan view, illustrating the liquid crystal display device LCD2 according to the second embodiment of the present invention as viewed from an observer, that is, a plan view illustrating a structure in which a display device substrate having color filters and touch sensing lines is laminated on the array substrate 200 via a liquid crystal layer.

Figure 24:
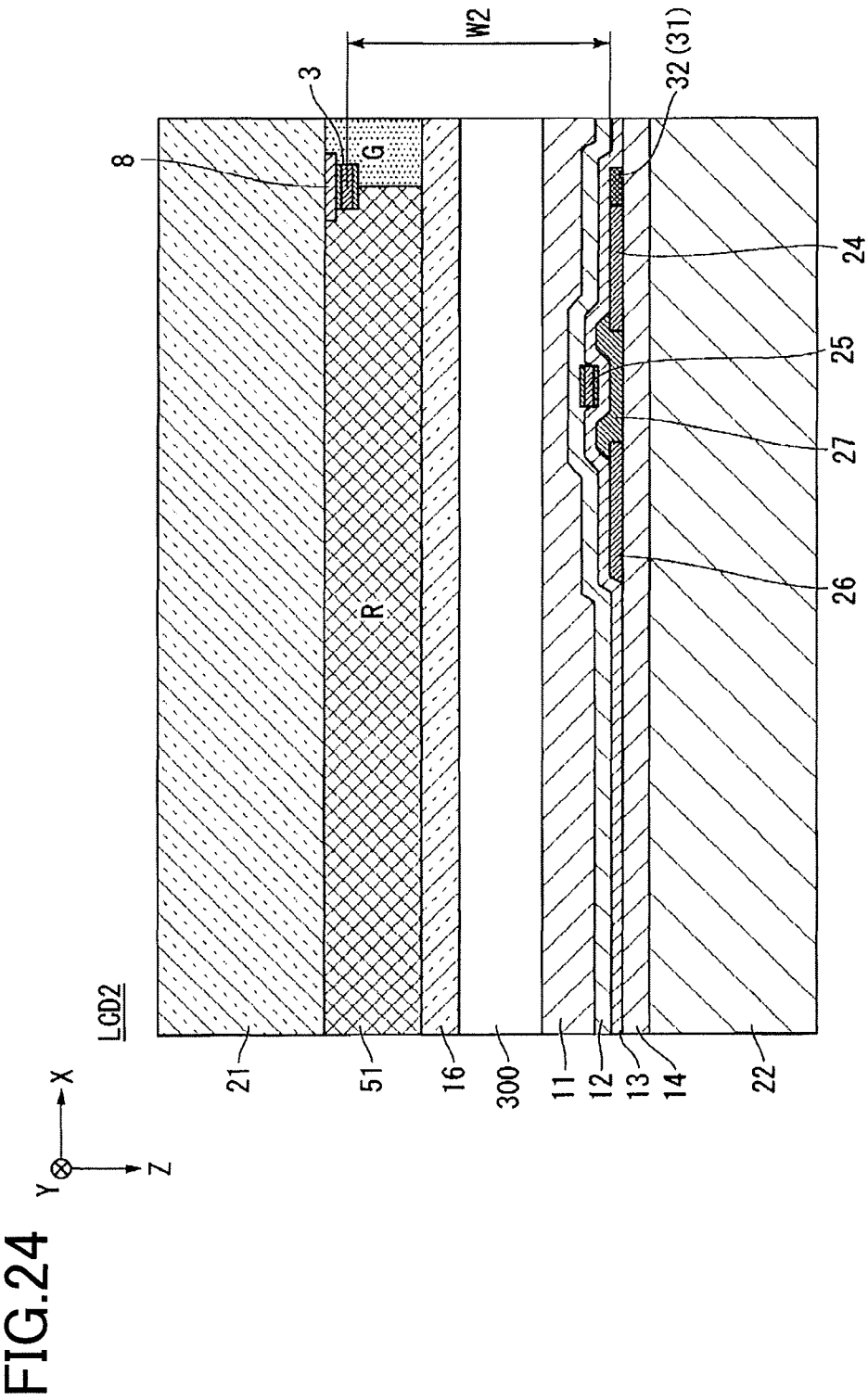
FIG. 24 is a partial cross-sectional view taken along the line E-E' of FIG. 21, illustrating the array substrate constituting the liquid crystal display device according to the second embodiment of the present invention.

FIG. 24 is a partial cross-sectional view taken along the line E-E' of FIG. 21, illustrating the array substrate 200 constituting the liquid crystal display device LCD2 according to the second embodiment of the present invention.

Figure 25:
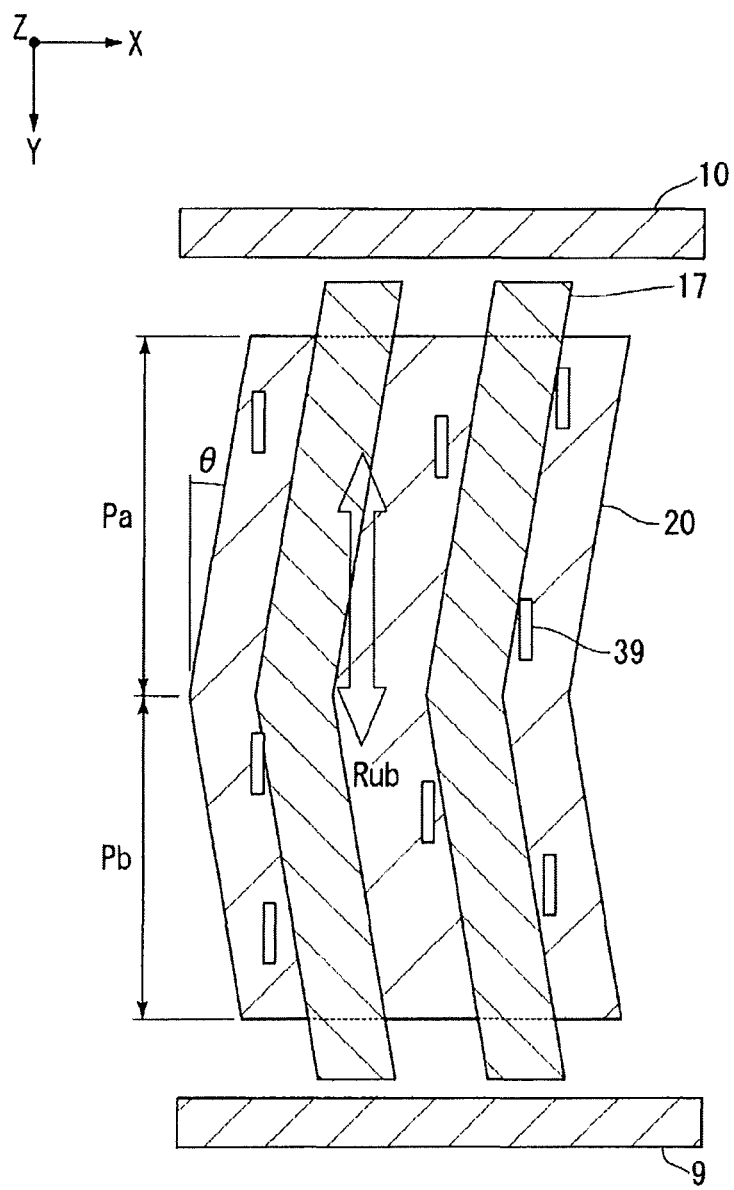
FIG. 25 is a partial plan view illustrating a pixel of a liquid crystal display device, according to the second embodiment of the present invention, that is, illustrating how liquid crystals are aligned in a pixel.

FIG. 25 is a partial plan view illustrating a pixel of a liquid crystal display device LCD2, according to the second embodiment of the present invention, that is, illustrating how liquid crystals are aligned in a pixel.

Figure 26:
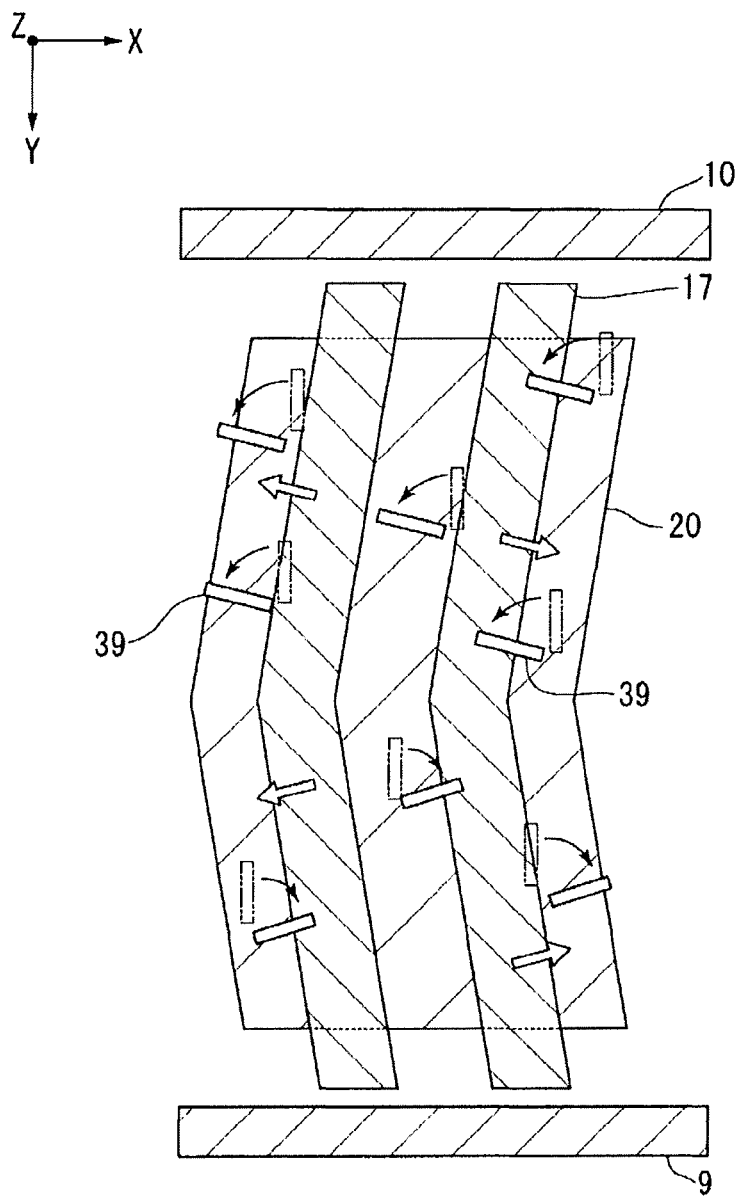
FIG. 26 is a partial plan view illustrating a pixel of a liquid crystal display device according to the second embodiment of the present invention, that is, illustrating how liquid crystals are driven when a liquid crystal driving voltage is applied across a pixel electrode and a common electrode.

FIG. 26 is a partial plan view illustrating a pixel of a liquid crystal display device LCD2 according to the second embodiment of the present invention, that is, illustrating how liquid crystals are driven when a liquid crystal driving voltage is applied across a pixel electrode and a common electrode.

As shown in FIG. 21, each pixel provided to the liquid crystal display device LCD2 of the second embodiment has a dog-legged pattern.

As shown in FIGS. 25 and 26, the common electrode 17 and the pixel electrode 20 have a part that is inclined at an angle θ relative to the Y direction. Specifically, the common electrode 17 and the pixel electrode 20 in each pixel have an upper area Pa (first area) and a lower area Pb (second area). The upper area Pa and the lower area Pb are arranged line-symmetrically relative to the pixel center (center line parallel to the X direction). In the upper area Pa, the common electrode 17 and the pixel electrode 20 are inclined clockwise at the angle θ relative to the Y direction. In the lower area Pb, the common electrode 17 and the pixel electrode 20 are inclined counterclockwise at the angle θ relative to the Y direction. By allowing the common electrode 17 and the pixel electrode 20 to incline in this manner and by applying rubbing to the alignment film along an alignment direction Rub that is parallel to the Y direction, an initial alignment is imparted to the liquid crystal molecules 39 in the Y direction. Alignment treatment can be applied to the film by optical alignment or rubbing. The angle θ is not required to be specifically defined but may be in the range, for example, of 3° to 15°. In FIG. 21, the common electrode 17 has two electrode parts 17A, which are formed in a dog-legged shape. The first and second contact holes 11H, 12H are located at the center of the conductive pattern of each common electrode 17 (electrode parts 17A in dog-legged patterns).

As shown in FIG. 23, the dog-legged pattern is also imparted to the first source lines 31, second source lines 32, black layer 8 (Y direction extensions of the black matrix BM), touch sensing lines 3, and red filters (R), green filters (G), and blue filters (blue) forming the color filters 51.

In the example shown in FIG. 24, the channel layer 27, the source electrode 24, and the drain electrode 26 are formed on the fourth insulating layer 14. In the first embodiment described above (FIG. 11), the source electrode 24 and the drain electrode 26 are formed on the channel layer 27. In the present embodiment, however, the channel layer 27 is formed on the source electrode 24 and the drain electrode 26.

In other words, in the present embodiment, the source electrode 24 and the drain electrode 26 are formed in advance on the fourth insulating layer 14. The source electrode 24 and the drain electrode 26 of the second embodiment each have a three-layer structure of molybdenum/aluminum alloy/molybdenum. Part of the channel layer 27 overlaps the source electrode 24 and the drain electrode 26. As the material for the channel layer 27, a composite oxide semiconductor made of indium oxide, gallium oxide, and zinc oxide is used.

Referring to FIGS. 25 and 26, advantages exerted by the pixel shape described above will be described.

FIG. 26 illustrates liquid crystal driving operation when a liquid crystal driving voltage is applied across the common electrode 17 and the pixel electrode 20. The liquid crystal driving voltage is applied from the pixel electrode 20 in the direction indicated by the arrows at the common electrode 17 to create a fringe electric field. As shown in FIG. 27, the fringe electric field extends from the pixel electrode 20 to the common electrode 17 to drive the liquid crystal molecules 39 along the fringe electric field, for rotation in the direction of the arrows in plan view. As shown in FIG. 26, the liquid crystal molecules 39 located in the upper area Pa of the pixel rotate in a direction opposite to that of the liquid crystal molecules 39 located in the lower area Pb of the pixel. Specifically, the liquid crystal molecules 39 in the upper area Pa rotate counterclockwise while the liquid crystal molecules 39 in the lower area Pb rotate clockwise. This method of rotation can achieve optical compensation and increase the viewing angle for the liquid crystal display device LCD2.

In the present embodiment, liquid crystal molecules having positive dielectric anisotropy are used as the liquid crystal molecules 39. If liquid crystal molecules having negative dielectric anisotropy are used, they are unlikely to rise in the thickness direction of the liquid crystal layer 300. In the present embodiment, it is preferred to use liquid crystal molecules having negative dielectric anisotropy because a touch driving voltage is applied in a direction from the touch sensing lines 3 toward the common electrodes 17, i.e., in an oblique direction inclined relative to the thickness direction of the liquid crystal. It is preferred that the liquid crystal material of the liquid crystal layer 300 is a highly pure material having intrinsic resistivity such as of $1\times10^{12}\Omega cm$ or more.

According to the present embodiment, alignment treatment is applied in the alignment direction Rub that is parallel to the Y direction. Therefore, in addition to the advantage achieved in the first embodiment described above, there is an advantage of providing initial alignment to the liquid crystal molecules 39 in each of the upper and lower areas Pa, Pb.

For example, a liquid crystal display device according to the embodiments described above can be put into practice in various ways. Examples of electronic devices to which the liquid crystal display device according to the above embodiments of the present invention can be applied include mobile phones, mobile game consoles, mobile terminal devices, personal computers, electronic books, video cameras, digital still cameras, head mounted displays, navigation systems, sound reproduction systems (car audios, digital audio players, etc.), copying machines, facsimile, printers, multifunction printers, vending machines, automated teller machines (ATM), personal authentication devices, optical communication devices, and the like. The embodiments described above can be used in any combination.

Preferred embodiments of the present invention have so far been described. These embodiments are only examples and should not be taken as limiting the invention. Additions, omissions, substitutions, and other changes may be made without departing from the scope of the invention. Accordingly, the invention should not be construed as being limited by the foregoing description, but as being limited by the claims.

In the embodiments described above, stripe patterns or dog-legged patterns extending in the Y direction have been described as patterns of the common electrodes 17, but the present invention should not be limited to these configurations. For example, square patterns, rectangular patterns, parallelogram patterns, and other patterns may be used.

As discussed above, the present application relates to taking measures against the noise caused by liquid crystal driving to improve sensitivity in touch sensitive in-cell display devices.

As set forth above, polarity inversion driving method is generally used for driving liquid crystal to avoid sticking of display images caused by accumulated charge. Source lines for transmitting video signals, however, have been the sources of noise that is attributed to polarity inversion. In addition, source lines easily induce change in parasitic capacitance that is associated with polarity inversion of video signals. It is important for touch sensitive in-cell display devices to reduce or prevent the occurrence of noise caused by the source lines to which video signals are transmitted.

Further, as disclosed in Patent Literature 6, a touch sensitive array substrate (TFT substrate) having a touch sensing function has lines (hereinafter referred to as touch sensing lines) associated with touch sensing. The touch sensing lines are provided being very close to and parallel to respective signal lines, such as source lines or gate lines, for driving the active elements (TFTs) concerned. The source lines, which transmit video signals with various voltages and with high frequency, particularly adversely affect the touch sensing lines.

The active elements each using a polysilicon semiconductor as a channel layer of the transistor cause a large amount of leakage current, and require the video signals to be frequently rewritten. Thus, there is a concern that the noise from the source lines may affect the touch sensing lines. If sense lines (for detecting touch signals), drive lines (for touch sensing), and source lines and gate lines for driving the active elements are provided to a single touch-sensitive TFT array substrate, there is a need to provide jumper lines, bypass tunnels, and the like. This results in a complicated configuration that incurs high cost.

The present invention has an aspect to provide a liquid crystal display device that alleviates influence of noise on touch sensing, using a transverse electric field system as typified by the FFS mode.

A liquid crystal display device according to an aspect of the present invention includes: a display device substrate including a first transparent substrate and a touch sensing line provided on the first transparent substrate and extending in a first direction; an array substrate including a second transparent substrate, a plurality of polygonal pixel apertures on the second transparent substrate, a common electrode provided in each of the plurality of pixel apertures and having a constant potential, a first insulating layer provided under the common electrode, a pixel electrode provided under the first insulating layer in each of the plurality of pixel apertures, a second insulating layer provided under the pixel electrode, a conductive line electrically connected to the common electrode under the second insulating layer and extending in a second direction orthogonal to the first direction to cross the plurality of pixel apertures, a third insulating layer provided under the conductive line, first and second active elements provided under the third insulating layer and electrically connected to the pixel electrode, a first gate line extending in the second direction and establishing electrical linkage with the first active element, a second gate line extending in the second direction and establishing electrical linkage with the second active element, a first source line extending in the first direction in plan view to establish electrical linkage with the first or second active element, and a second source line extending in the first direction in plan view to establish electrical linkage with the second or first active element; a liquid crystal layer sandwiched between the display device substrate and the array substrate; and a control unit supplying a negative first video signal to the first source line and a positive second video signal to the second source line, driving the liquid crystal layer by applying a liquid crystal driving voltage across the pixel electrode and the common electrode in synchronization with the supply of the first video signal and the second video signal to display an image, and detecting a change in capacitance between the common electrode and the touch sensing line to carry out touch sensing.

In the liquid crystal display device according to an aspect of the present invention, a longitudinal direction of the pixel aperture may correspond to the first direction; and the common electrode may be electrically connected to the conductive line through a contact hole formed in the first insulating layer and the second insulating layer.

In a liquid crystal display device according to an aspect of the present invention, in each of the plurality of pixel apertures, the common electrode may have one or more electrode parts extending in the first direction in plan view; the contact hole may be formed at a center in a longitudinal direction of a pattern of the electrode part; and the common electrode may be electrically connected to the conductive line through the contact hole.

In a liquid crystal display device according to an aspect of the present invention, in each of the plurality of pixel apertures, the common electrode may include one or more electrode parts formed in a dog-legged shape; the contact hole may be formed at a center of a pattern of the electrode part; and the common electrode may be electrically connected to the conductive line through the contact hole.

In a liquid crystal display device according to an aspect of the present invention, the pixel electrode may have a through-hole from which a transparent conductive film is removed; and the contact hole may be provided inside the through-hole.

In a liquid crystal display device according to an aspect of the present invention, the common electrode may be grounded through a high resistance.

In a liquid crystal display device according to an aspect of the present invention, the display device substrate may include a black matrix provided between the first transparent substrate and the touch sensing line; and the touch sensing line may overlap with part of the black matrix.

In a liquid crystal display device according to an aspect of the present invention, the display device substrate may have a frame area surrounding a display area and a display screen in a rectangular shape in plan view; and the touch sensing line may have a terminal part provided at an extension portion protruding from the frame area without overlapping the black matrix.

In a liquid crystal display device according to an aspect of the present invention, the touch sensing line may obliquely face the common electrode relative to a thickness direction of the liquid crystal layer.

In a liquid crystal display device according to an aspect of the present invention, the first and second active elements may be thin film transistors each having a channel layer formed of an oxide semiconductor.

In a liquid crystal display device according to an aspect of the present invention, the oxide semiconductor may be an oxide semiconductor containing two or more metal oxides of gallium, indium, zinc, tin, aluminum, germanium, and cerium.

In a liquid crystal display device according to an aspect of the present invention, the first and second active elements may be top-gate transistors.

In a liquid crystal display device according to an aspect of the present invention, a liquid crystal of the liquid crystal layer may be initially aligned parallel to the array substrate, and may be driven by a fringe electric field created by a liquid crystal driving voltage applied across the common electrode and the pixel electrode.

In a liquid crystal display device according to an aspect of the present invention, the common electrode and the pixel electrode may be made of a composite oxide containing at least indium oxide and tin oxide.

In a liquid crystal display device according to an aspect of the present invention, the touch sensing line may be formed of a metal layer containing a copper alloy layer.

In a liquid crystal display device according to an aspect of the present invention, the touch sensing line may have a structure in which a copper alloy layer is sandwiched between two conductive metal oxide layers.

In a liquid crystal display device according to an aspect of the present invention, the conductive line may have a structure in which a copper alloy layer is sandwiched between two conductive metal oxide layers.

In a liquid crystal display device according to an aspect of the present invention, the conductive metal oxide layer may be a composite oxide layer containing indium oxide, zinc oxide, and tin oxide.

In a liquid crystal display device according to an aspect of the present invention, the display device substrate may include color filters respectively provided at positions corresponding to the plurality of pixel apertures.

According to an aspect of the present invention, there is provided a liquid crystal display device that alleviates noise adversely affecting touch sensing and simplifies a line structure associated with touch sensing.

Reference Signs List
- 3 . . . Touch sensing line
- 4 . . . Second conductive metal oxide layer (conductive metal oxide layer)
- 5 . . . Metal layer
- 6 . . . First conductive metal oxide layer (conductive metal oxide layer)
- 8 . . . Black layer
- 9 . . . Second gate line
- 10 . . . First gate line
- 11 . . . First insulating layer
- 11F . . . Filled part
- 11H . . . First contact hole (contact hole)
- 11T . . . Upper surface
- 12 . . . Second insulating layer
- 12H . . . Second contact hole (contact hole)
- 12T . . . Upper surface
- 13 . . . Third insulating layer
- 13A . . . Protrusion
- 14 . . . Fourth insulating layer
- 16 . . . Transparent resin layer
- 17 . . . Common electrode
- 17A . . . Electrode part
- 17B . . . Conductive connecting part
- 17K . . . Wall
- 18 . . . Pixel aperture
- 20 . . . Pixel electrode
- 20K . . . Inner wall
- 20S . . . Through-hole
- 21 . . . Transparent substrate (first transparent substrate)
- 22 . . . Transparent substrate (Second transparent substrate)
- 24 . . . Source electrode
- 25 . . . Gate electrode
- 25a . . . First gate electrode
- 25b . . . Second gate electrode
- 26 . . . Drain electrode
- 27 . . . Channel layer
- 28 . . . Active element
- 28a . . . First active element
- 28b . . . Second active element
- 29 . . . Contact hole
- 30 . . . Common line (conductive line)
- 31 . . . First source line
- 32 . . . Second source line
- 33 . . . Electric force line
- 34 . . . Terminal part
- 39 . . . Liquid crystal molecule
- 51 . . . Color filter
- 100 . . . Display device substrate
- 110 . . . Display unit
- 120 . . . Control unit
- 121 . . . Video signal controller
- 122 . . . Touch sensing controller
- 123 . . . System controller
- 200 . . . Array substrate
- 206 . . . Liquid crystal layer
- 213 . . . Transparent resin layer
- 214 . . . Color filter
- 215 . . . Transparent substrate
- 221 . . . Counter electrode
- 250 . . . Liquid crystal display device
- 250A . . . Liquid crystal display device
- 300 . . . Liquid crystal layer
- BM . . . Black matrix
- BU . . . Backlight unit
- W17A . . . Line width
- D20S . . . Diameter
- EL . . . Length
- L . . . Light
- L2 . . . Equipotential line
- L3 . . . Equipotential line
- LCD1 . . . Liquid crystal display device
- LCD2 . . . Liquid crystal display device
- P17A . . . Pitch
- Pa . . . Upper area
- Pb . . . Lower area
- Rub . . . Alignment direction
- W2 . . . Distance
- W3 . . . Height
- θ . . . Angle (inclination from a longitudinal direction Y of a pixel aperture)

Obviously, numerous modifications and variations of the present invention are possible in light of the above teachings. It is therefore to be understood that within the scope of the appended claims, the invention may be practiced otherwise than as specifically described herein.

What is claimed is:

1. A liquid crystal display device, comprising:
a display substrate including a first transparent substrate and a touch sensing line provided on the first transparent substrate and extending in a first direction;
an array substrate including a second transparent substrate, a plurality of polygonal pixel apertures on the second transparent substrate, a common electrode provided in each of the plurality of pixel apertures and having a constant potential, a first insulating layer provided under the common electrode, a pixel electrode provided under the first insulating layer in each of the plurality of pixel apertures, a second insulating layer provided under the pixel electrode, a conductive line electrically connected to the common electrode under the second insulating layer and extending in a second direction orthogonal to the first direction to cross the plurality of pixel apertures, a third insulating layer provided under the conductive line, first and second active elements provided under the third insulating layer and electrically connected to the pixel electrode, a first gate line extending in the second direction and establishing electrical linkage with the first active element, a second gate line extending in the second direction and establishing electrical linkage with the second active element, a first source line extending in the first direction in plan view to establish electrical linkage with the first or second active element, and a second source line extending in the first direction in plan view to establish electrical linkage with the second or first active element;
a liquid crystal layer sandwiched between the display substrate and the array substrate; and
control circuitry configured to supply a negative first video signal to the first source line and a positive second video signal to the second source line, drive the liquid crystal layer by applying a liquid crystal driving voltage across the pixel electrode and the common electrode in synchronization with supply of the negative first video signal and the positive second video signal to display an image, and detect a change in capacitance between the common electrode and the touch sensing line to carry out touch sensing.

2. The liquid crystal display device according to claim 1, wherein:
a longitudinal direction of the pixel aperture corresponds to the first direction, and
the common electrode is electrically connected to the conductive line through a contact hole formed in the first insulating layer and the second insulating layer.

3. The liquid crystal display device according to claim 2, wherein:
in each of the plurality of pixel apertures, the common electrode has one or more electrode parts extending in the first direction in plan view,
the contact hole is formed at a center in a longitudinal direction of a pattern of the electrode part, and
the common electrode is electrically connected to the conductive line through the contact hole.

4. The liquid crystal display device according to claim 2, wherein:
in each of the plurality of pixel apertures, the common electrode includes one or more electrode parts formed in a dog-legged shape,
the contact hole is formed at a center of a pattern of the electrode part, and
the common electrode is electrically connected to the conductive line through the contact hole.

5. The liquid crystal display device according to claim 3, wherein:
the pixel electrode has a through-hole from which a transparent conductive film is removed, and
the contact hole is provided inside the through-hole.

6. The liquid crystal display device according to claim 1, wherein:
the display substrate has a frame area surrounding a display area and a display screen in a rectangular shape in plan view, and
the touch sensing line has a terminal part provided at an extension portion protruding from the frame area without overlapping the black matrix.

7. The liquid crystal display device according to claim 1, wherein the touch sensing line obliquely faces the common electrode relative to a thickness direction of the liquid crystal layer.

8. The liquid crystal display device according to claim 1, wherein the first and second active elements are thin film transistors each having a channel layer formed of an oxide semiconductor.

9. The liquid crystal display device according to claim 8, wherein the oxide semiconductor is an oxide semiconductor containing two or more metal oxides of gallium, indium, zinc, tin, aluminum, germanium, and cerium.

10. The liquid crystal display device according to claim 1, wherein the first and second active elements are top-gate transistors.

11. The liquid crystal display device according to claim 1, wherein:
a liquid crystal of the liquid crystal layer is:
initially aligned parallel to the array substrate, and
driven by a fringe electric field created by a liquid crystal
driving voltage applied across the common electrode and the pixel electrode.

12. The liquid crystal display device according to claim 1, wherein the common electrode and the pixel electrode are made of a composite oxide containing at least indium oxide and tin oxide.

13. The liquid crystal display device according to claim 1, wherein the touch sensing line is formed of a metal layer containing a copper alloy layer.

14. The liquid crystal display device according to claim 1, wherein the touch sensing line has a structure in which a copper alloy layer is sandwiched between two conductive metal oxide layers.

15. The liquid crystal display device according to claim 14, wherein the conductive metal oxide layer is a composite oxide layer containing indium oxide, zinc oxide, and tin oxide.

16. The liquid crystal display device according to claim 1, wherein the conductive line has a structure in which a copper alloy layer is sandwiched between two conductive metal oxide layers.

17. The liquid crystal display device according to claim 16, wherein the conductive metal oxide layer is a composite oxide layer containing indium oxide, zinc oxide, and tin oxide.

18. The liquid crystal display device according to claim 1, wherein the display substrate includes color filters respectively provided at positions corresponding to the plurality of pixel apertures.

* * * * *